(12) United States Patent
Kurihara et al.

(10) Patent No.: US 7,662,424 B2
(45) Date of Patent: Feb. 16, 2010

(54) METHOD OF MAKING COMPOSITE PARTICLE FOR ELECTRODE, METHOD OF MAKING ELECTRODE, METHOD OF MAKING ELECTROCHEMICAL DEVICE, APPARATUS FOR MAKING COMPOSITE PARTICLE FOR ELECTRODE, APPARATUS FOR MAKING ELECTRODE, AND APPARATUS FOR MAKING ELECTROCHEMICAL DEVICE

(75) Inventors: Masato Kurihara, Tokyo (JP); Satoshi Maruyama, Tokyo (JP); Tadashi Suzuki, Tokyo (JP)

(73) Assignee: TDK Corporation, Tokyo (JP)

( * ) Notice: Subject to any disclaimer, the term of this patent is extended or adjusted under 35 U.S.C. 154(b) by 934 days.

(21) Appl. No.: 10/924,858

(22) Filed: Aug. 25, 2004

(65) Prior Publication Data

US 2005/0064096 A1 Mar. 24, 2005

(30) Foreign Application Priority Data

Aug. 29, 2003 (JP) .......................... P2003-307891
Aug. 29, 2003 (JP) .......................... P2003-308046

(51) Int. Cl.
    *B05D 5/12* (2006.01)
(52) U.S. Cl. .............................. 427/58; 419/11; 429/57; 429/300; 429/126; 429/144; 429/304; 429/218; 429/232; 205/471; 427/126.1; 427/180; 427/185; 427/196; 427/212; 427/213; 427/242
(58) Field of Classification Search ................ 205/471; 429/218, 300, 126, 57, 62; 419/11; 427/58
See application file for complete search history.

(56) References Cited

U.S. PATENT DOCUMENTS 5,304,342 A * 4/1994 Hall et al. ...................... 419/11
5,591,547 A * 1/1997 Yoneda et al. ............... 429/220

(Continued)

FOREIGN PATENT DOCUMENTS

JP         A 63-121260         5/1988

(Continued)

OTHER PUBLICATIONS

Bower et al., Plasma-induced alignment of carbon annotubes, Applied Physics Letters, vol. 77, No. 6, pp. 830-832.*

(Continued)

*Primary Examiner*—Michael Barr
*Assistant Examiner*—Andrew Bowman
(74) *Attorney, Agent, or Firm*—Oliff & Berridge, PLC

(57) ABSTRACT

The method of making a composite particle for an electrode in accordance with the present invention comprises a granulating step of integrating a conductive auxiliary agent and a binder adapted to bind the conductive auxiliary agent and an electrode active material together with a particle made of the electrode active material while in close contact with each other in an inert gas atmosphere so as to form a composite particle for an electrode containing the electrode active material, conductive auxiliary agent, and binder. When the composite particle obtained by this method is used as a constituent of an electrode, an electrode having an excellent electrode characteristic and an electrochemical device having excellent electrochemical characteristics can be formed easily and reliably.

18 Claims, 25 Drawing Sheets

U.S. PATENT DOCUMENTS 6,420,071 B1 * 7/2002 Lee et al. .................. 429/300

FOREIGN PATENT DOCUMENTS

| JP | A 2-262243 | | 10/1990 |
| --- | --- | --- | --- |
| JP | A 10-092432 | | 4/1998 |
| JP | A 2000-040504 | | 2/2000 |
| JP | 2000-040504 A | * | 8/2000 |
| JP | A 2000-223121 | | 8/2000 |
| JP | 2002-083585 | * | 3/2002 |
| JP | A 2002-083585 | | 3/2002 |
| JP | 2003-173777 A | * | 6/2003 |
| KR | 2001-0096073 | | 11/2001 |
| KR | 20010096073 | * | 11/2001 |
| KR | 2002-0006387 | * | 1/2002 |
| KR | 20020006387 | * | 1/2002 |

OTHER PUBLICATIONS

Bower et al., Plasma-induced alignment of carbon nanotubes, Jun. 2000, Applied Physics Letters, vol. 77 No. 6, pp. 830-832.*

* cited by examiner

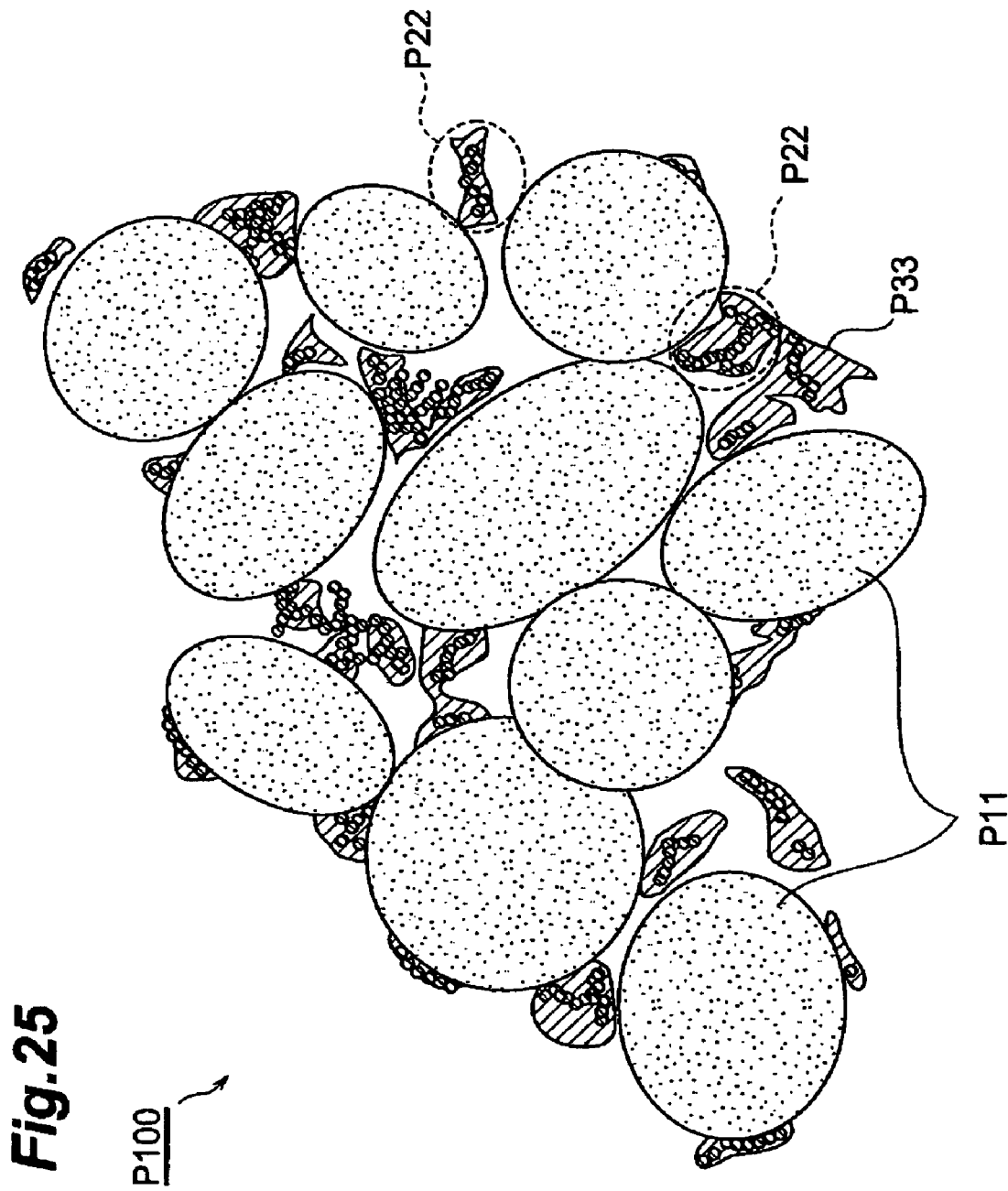

METHOD OF MAKING COMPOSITE PARTICLE FOR ELECTRODE, METHOD OF MAKING ELECTRODE, METHOD OF MAKING ELECTROCHEMICAL DEVICE, APPARATUS FOR MAKING COMPOSITE PARTICLE FOR ELECTRODE, APPARATUS FOR MAKING ELECTRODE, AND APPARATUS FOR MAKING ELECTROCHEMICAL DEVICE

BACKGROUND OF THE INVENTION

1. Field of the Invention

The present invention relates to a method of making a composite particle for an electrode, which becomes a constituent material of an electrode usable in an electrochemical device such as primary battery, secondary battery (lithium ion secondary battery in particular), electrolytic cell, and capacitor (electrochemical capacitor in particular), a method of making an electrode formed by using thus obtained composite particle for an electrode, and a method of making an electrochemical device equipped with the electrode. The present invention also relates to apparatus for making a composite particle for an electrode, an electrode, and an electrochemical device, which are equipped with respective mechanisms based on the methods mentioned above.

2. Related Background Art

In recent years, portable devices have been developing remarkably. Its major driving forces include developments in high-energy batteries such as lithium ion secondary batteries widely employed as power supplies for the devices.

A high-energy battery such as lithium ion secondary battery is mainly constituted by a cathode, an anode, and an electrolytic layer (e.g., a layer made of a liquid or solid electrolyte) disposed between the cathode and anode. Conventionally, the cathode and/or anode has been made by way of the steps of preparing its corresponding electrode forming coating liquid (e.g., in a slurry or paste form) containing an electrode active material therefor, a binder (synthetic resin or the like), a conductive auxiliary agent, and a dispersant and/or solvent; applying the coating liquid to a surface of a collector member (e.g., metal foil); and then drying, so as to form a layer containing the electrode active material (hereinafter referred to as "active material containing layer") on the surface of the collector member.

In this method (wet method), there are cases where no conductive auxiliary agent is added to the coating liquid. There are also cases where a kneaded product containing the electrode active material, binder, and conductive auxiliary agent without using the dispersant and solvent is prepared in place of the coating liquid and then is formed into a sheet by using a hot roller and/or a hot press (dry method). Further, there are cases where a conductive polymer is added to the coating liquid, so as to form a so-called "polymer electrode". When the electrolyte layer is solid, there are cases where a method of applying the coating liquid to the surface of the electrolyte layer is employed.

In the fields of high-energy batteries such as lithium ion secondary batteries and electrochemical devices such as electrochemical capacitors represented by electric double layer capacitors, various studies and developments have been under way in order to further improve characteristics in response to future developments of devices such as portable devices in which electrochemical devices are to be mounted.

In the case of high-energy batteries, improvements in battery characteristics such as higher capacity, improved safety, and improved energy density have been demanded. In order for lithium ion second batteries and the like to attain such higher performances, it is important to choose electrode materials. There are a wide variety of carbon materials as constituent materials of the anode, whereby various carbon materials ranging from highly crystalline graphite to carbonized polymers have been under study.

Electrochemical characteristics of batteries such as charging/discharging potential, reversible capacity, and cycle characteristic heavily depend on the degree of crystallinity (degree of graphitization), surface form, internal structure, surface chemical composition, and the like of the carbon material employed as the anode active material (negative electrode active material). In lithium ion secondary batteries using a carbon material in an anode active material, a SEI (Solid Electrolyte Interface) formed on the anode active material surface at the time of initial charging greatly influences characteristics. The SEI is generated by a reaction between the anode active material and an electrolytic solution. Once the SEI is formed, the reaction is restrained from advancing further, whereby lithium can be inserted between layers of graphite. However, the SEI is one of causes generating an irreversible capacity. The thermal stability concerning the safety of batteries depends on the stability of SEI. Because of a mechanism in which the SEI is formed by the reaction between the anode active material and the electrolytic solution, the SEI is greatly influenced by the amount of oxygen-containing functional groups such as carboxyl group and carbonyl group on the carbon particle surface and the surface structure of the carbon material such as surface crystallinity of carbon particles.

In order to overcome such a problem and yield favorable electrode and battery characteristics, to lower the irreversible capacity in particular, a technique in which a carbon material (after activation; activated carbon or the like) to become an electrode active material is subjected to thermal plasma processing, so as to purify the surface of the carbon material has been proposed (see, for example, Japanese Patent Application Laid-Open Nos. HEI 10-92432 and 2000-223121).

Though no detailed mechanisms have been elucidated yet, it has been known in general that electrochemical characteristics such as the reversible capacity, voltage resistance characteristic, cycle characteristic, and stability at the time of high-temperature storage are greatly influenced by the degree of crystallinity (degree of graphitization), surface form, internal structure, surface chemical composition, absorbed moisture amount, and the like of particles of the carbon material acting as the electrode active material. It has also been known that the amount of oxygen-containing functional groups such as carboxyl and carbonyl groups on the particle surface of the carbon material greatly affects the electrochemical characteristics mentioned above.

The above-mentioned technique intends to purify the surface of the carbon material to become the electrode active material by thermal plasma processing, and make the physical and chemical states of the surface attain states suitable for yielding sufficient electrochemical characteristics.

On the other hand, a lithium secondary battery positive electrode and a method of making the same have been proposed, in which a composite particle constituted by a manganese dioxide (cathode active material) particle and a carbon material powder (conductive auxiliary agent) immobilized on the surface of the manganese dioxide particle is used as an electrode material of the cathode, so as to prevent the charging/discharging capacity of the battery from decreasing because of the cathode, thereby further improving electrochemical characteristics (see, for example, Japanese Patent Application Laid-Open No. HEI 2-262243).

Also, a method of making a positive electrode mixture for an organic electrolytic solution battery has been proposed, in which a slurry, constituted by a positive electrode active material (cathode active material), a conductive agent (conductive auxiliary agent), a binder, and a solvent, having 20 to 50 wt % of a solid with an average particle size of 10 µm or smaller is prepared and is granulated by spray drying, so as to further improve characteristics such as discharging characteristic and productivity (see, for example, Japanese Patent Application Laid-Open No. 2000-40504).

SUMMARY OF THE INVENTION

However, the composite particle, electrode, and electrochemical device obtained by the conventional methods mentioned above have not been considered sufficient yet in terms of electrode and battery characteristics, whereby these methods still leave room for improvement.

In view of such circumstances, it is an object of the present invention to provide a method of making a composite particle for an electrode, which can form an electrode having an excellent electrode characteristic easily and reliably.

It is another object of the present invention to provide a method of making an electrode which can attain an excellent electrode characteristic.

It is still another object of the present invention to provide an electrochemical device which can attain an excellent charging/discharging characteristic.

It is still another object of the present invention to provide an apparatus for making a composite particle for an electrode, which can form an electrode having an excellent electrode characteristic easily and reliably.

It is still another object of the present invention to provide an electrode manufacturing apparatus which can easily and reliably make an electrode which can attain an excellent electrode characteristic.

It is still another object of the present invention to provide an electrochemical device manufacturing apparatus which can easily and reliably make an electrochemical device which can attain an excellent charging/discharging characteristic.

As a result of diligent studies for achieving the objects mentioned above, the inventors have found that the occurrence of the above-mentioned problems is greatly influenced by the state of dispersion of the electrode active material, conductive auxiliary agent, and binder failing to construct an effective conduction network, e.g., a nonuniform dispersion state, in the active material containing layer in the electrode obtained in the conventional electrode forming method.

The inventors have also found that electrochemical characteristics cannot improve as sufficiently as expected if moisture adheres to the surface of the particle made of an electrode active material, or a reaction with oxygen advances on the surface, so that an oxygen-containing functional group (carboxyl group, carbonyl group, or the like) combines with the surface.

In the case where moisture is attached to the carbon material in the electrode, for example, this water easily decomposes when a voltage is applied to the electrochemical device, thereby causing an irreversible capacity to occur and deteriorating the cycle characteristic. Further, in the electrode, a gas is generated by the decomposition of water, or water exists as steam, so that an electric double layer cannot be formed sufficiently, whereby the capacity decreases. Furthermore, when moisture (in a liquid or solid form) is attached to the electrode, impedance increases in the electrode, thereby deteriorating the cycle characteristic. Also, a minute amount of moisture in the electrode promotes a decomposition reaction of a nonaqueous electrolytic solution at a high temperature (45° C. or higher) in particular, whereby the stability at the time of storage at a high temperature (45° C. or higher) deteriorates in particular. If an oxygen-containing functional group exists, a sufficient electric double layer cannot be formed, whereby the capacity decreases.

The inventors have found that a granulating step carried out in an inert atmosphere when making a composite particle containing, at least, an electrode active material, a conductive auxiliary agent, and a binder as constituent materials can sufficiently disperse the electrode active material, conductive auxiliary agent, and binder, thereby constructing an effective conductive network, and thus achieved the present invention.

Namely, the present invention provides a method of making a composite particle for an electrode, the method comprising a granulating step of integrating a conductive auxiliary agent and a binder adapted to bind the conductive auxiliary agent and an electrode active material together with a particle made of the electrode active material while in close contact with each other in an inert gas atmosphere so as to form a composite particle for an electrode containing the electrode active material, conductive auxiliary agent, and binder.

In the method of making a composite particle for an electrode in accordance with the present invention, the granulating step is carried out in an inert gas atmosphere, so that the surface of the particle made of the electrode active material is sufficiently prevented from being exposed to an atmosphere such as air containing moisture and oxygen, whereby the surface of the electrode active material is purified, and the surface can keep physical and chemical states suitable for yielding sufficient electrochemical characteristics. Therefore, when the composite particle for an electrode formed by using this electrode active material is employed as a constituent material, an electrode and an electrochemical device which can attain sufficient electrochemical characteristics can be obtained.

More specifically, the composite particle obtained by the method of making a composite particle for an electrode in accordance with the present invention is a particle in which the conductive auxiliary agent, electrode active material, and binder are in close contact with each other while in respective quite favorable dispersion states. This composite particle is used as a main ingredient of a powder when an active material containing layer of an electrode is made by a dry method which will be explained later, or as a constituent material of a coating liquid or kneaded product when an active material containing layer of an electrode is formed by a wet method which will be explained later.

Within the composite particle, a quite favorable electron conduction path (electron conduction network) is constructed three-dimensionally. In the case where the composite particle is used as a main ingredient of a powder when making the active material containing layer of the electrode by the dry method explained later, the structure of the electron conduction path can substantially keep its initial state easily even after forming the active material containing layer by heat treatment. In the case where the composite particle is used as a constituent material of a coating liquid or kneaded product when forming the active material containing layer of the electrode by the wet method explained later, the structure of the electron conduction path can substantially keep its initial state easily even after preparing the coating liquid or kneaded product containing the composite particle if the preparing condition is adjusted (e.g., a dispersant or solvent for preparing the coating liquid is selected).

Hence, from the foregoing viewpoints, an electrode and electrochemical device which can attain sufficient electrochemical characteristics can be obtained when the composite particle obtained by the method of making a composite particle for an electrode in accordance with the present invention is used as a constituent material.

In the method of making a composite particle for an electrode in accordance with the present invention, the granulating step is carried out in an inert gas atmosphere as such. This can sufficiently prevent the surface of the particle made of an electrode active material from being exposed to an atmosphere such as air containing moisture and oxygen. Therefore, an electrode and electrochemical device which can attain sufficient electrochemical characteristics can be obtained when the composite particle obtained by the method of making a composite particle for an electrode in accordance with the present invention is used as a constituent material from this viewpoint as well.

In the present invention, "inert gas" refers to noble gases and nitrogen gas. On the other hand, "inert gas atmosphere" refers to an atmosphere having an inert gas content of at least 99.9%, preferably at least 99.9%, a relative humidity of 0.5% (dew point of about −40° C.) or less, preferably 0.04% (dew point of about −60° C.) or less, and an oxygen content of 10 ppm or less, preferably 1 ppm or less. The "inert gas atmosphere" in the granulating step can be realized by carrying out manufacturing steps subsequent to the granulating step while using "inert gas atmosphere forming means" such as a dry room or glove box.

Depending on the electrode to be formed, "electrode active material" to become a constituent material of the composite particle refers to the following materials. Namely, "electrode active material" refers to a reducing agent and an oxidizing agent when the electrode to be formed is an electrode used as an anode and a cathode of a primary battery, respectively. The "particle made of the electrode active material" may contain materials other than the electrode active material to such an extent that functions of the present invention (functions of the electrode active material) are not lost.

When the electrode to be formed is an anode (at the time of discharging) used in a secondary battery, "electrode active material" refers to a reducing agent, which can exist chemically stably in any of its reduced and oxidized states while being able to reversibly advance a reducing reaction from the oxidized state to the reduced state and an oxidizing reaction from the reduced state to the oxidized state.

When the electrode to be formed is an electrode used in a primary or secondary battery, the "electrode active material" may also be a material adapted to occlude or release (intercalate or dope/undope) a metal ion involving in an electrode reaction. Examples of the material include carbon materials used in anodes and/or cathodes of lithium ion secondary batteries, and metal oxides (including mixed metal oxides).

For convenience of explanation, the electrode active material of the anode is referred to as "anode active material", whereas the electrode active material of the cathode is referred to as "cathode active material". The "anode" in the "anode active material" is one (negative active material) with reference to the polarity of the battery at the time of discharging, whereas the "cathode" in the "cathode active material" is one (positive active material) with reference to the polarity of the battery at the time of discharging. Specific examples of the anode and cathode active materials will be explained later.

When the electrode to be formed is an electrode used in an electrolytic cell or capacitor (condenser), "electrode active material" refers to a metal (including metal alloys), a metal oxide, or a carbon material.

In the granulating step in accordance with the present invention, "integrating a conductive auxiliary agent and a binder with a particle made of the electrode active material while in close contact with each other" refers to bringing respective particles made of the conductive auxiliary agent and binder into close contact with at least a part of the surface of a particle made of the electrode active material. Namely, it will be sufficient if the surface of the particle made of the electrode active material is partly covered with the respective particles made of the conductive auxiliary agent and binder. It is not necessary for the surface to be fully covered. The "binder" used in the granulating step in the method of making a composite particle in accordance with the present invention refers to one which can bind the electrode active material and conductive auxiliary agent employed together therewith.

Adding a conductive polymer having an ionic conductivity as a constituent material when forming the composite particle can also easily construct a quite favorable ion conduction path within the composite particle (i.e., electrode) in the present invention.

When usable as a binder to become a constituent material of the composite particle, a conductive polymer having an ionic conductivity can be used. The binder having an ionic conductivity also seems to contribute to constructing an ion conduction path within the electrode (composite particle). Using such a composite particle can form a polymer electrode constituted by the composite particle. A polymer electrolyte having an electronic conductivity may also be used as a binder to become a constituent material of the composite particle.

Such a configuration allows the present invention to form an electrode having electronic and ionic conductivities superior to those in conventional electrodes easily and reliably. In the electrode made of the composite particle, a contact interface among the conductive auxiliary agent, electrode active material, and electrolyte (solid electrolyte or liquid electrolyte), which becomes a reaction field of a charge-transfer reaction progressing therewithin, is formed three-dimensionally with a sufficient size.

Since the composite particle is formed beforehand with the conductive auxiliary agent, electrode active material, and binder each being dispersed quite favorably, amounts of addition of the conductive auxiliary agent and binder can be made sufficiently smaller than those conventionally used.

When a conductive polymer is used in the present invention, the species of the conductive polymer may be either identical to or different from the above-mentioned conductive polymer to become a constituent material of the composite particle.

When the particle made of the electrode active material is a particle mainly composed of a carbon material having an electronic conductivity, it will be preferred if the method of making a composite particle for an electrode in accordance with the present invention further comprises a plasma processing step of subjecting a material made of a carbonaceous material to high-frequency thermal plasma processing in a plasma gas atmosphere so as to yield a particle made of an electrode active material having an electronic conductivity, whereas it will be preferred if the granulating step is a step of integrating the conductive auxiliary agent and the binder with the particle made of the electrode active material obtained after the plasma processing step in close contact with each other in the inert gas atmosphere so as to form the composite particle for an electrode containing the electrode active material, conductive auxiliary agent, and binder.

When the plasma processing step is provided, and the granulating step using the particle made of the electrode active material obtained by the plasma processing step is carried out in the inert gas atmosphere as such, the surface of the electrode active material is purified, and the surface can keep physical and chemical states suitable for yielding sufficient electrochemical characteristics.

The employment of the foregoing configurations and the above-mentioned effects exhibited thereby are based on the following inventors' findings.

Namely, the inventors have found that one of main reasons why electrodes and electrochemical devices made by techniques for making electrodes using thermal plasma processing and electrochemical devices equipped therewith disclosed in Japanese Patent Application Laid-Open No. HEI 10-92432 and 2000-223121 fail to yield sufficient electrochemical characteristics is that the carbon material with the purified surface is exposed to an atmosphere such as air containing moisture and oxygen.

More specifically, the inventors have found that the carbon material with the purified surface is exposed to an atmosphere such as air containing moisture and oxygen after the thermal plasma processing in the conventional techniques using the thermal plasma processing. Therefore, moisture may adhere again to the purified surface of the carbon material after the plasma processing, and a reaction with oxygen may proceed on the surface, so that oxygen-containing functional groups (carboxyl group, carbonyl group, etc.) may combine with the surface, whereby electrochemical characteristics may not be obtained by the plasma processing as fully as expected.

In the case where moisture is attached to the carbon material in the electrode, for example, this water easily decomposes when a voltage is applied to the electrochemical device, thereby causing an irreversible capacity to occur and deteriorating the cycle characteristic. Further, in the electrode, a gas is generated by the decomposition of water, or water exists as steam, so that no electric double layer can be formed sufficiently, whereby the capacity decreases. Furthermore, when moisture (in a liquid or solid form) adheres to the electrode, impedance increases in the electrode, thereby deteriorating the cycle characteristic. Also, a minute amount of moisture in the electrode promotes a decomposition reaction of a non-aqueous electrolytic solution at a high temperature (45° C. or higher) in particular, whereby the stability at the time of storage at a high temperature (45° C. or higher) deteriorates in particular. If an oxygen-containing functional group exists, a sufficient electric double layer cannot be formed, whereby the capacity decreases.

For example, by using a thermodesorption mass spectrometer (TDS), the inventors measured those left for 2 hours in the air (at a temperature of 25° C. with a relative humidity of 45%) among carbon materials subjected to high-frequency thermal plasma processing, and verified that a large amount of a gas derived from hydroxyl groups occurred from carbon material surfaces.

When the plasma processing step is provided, and the granulating step using the particle made of the electrode active material obtained by the plasma processing step is carried out in the inert gas atmosphere in the present invention, by contrast, the surface of the electrode active material is purified, and the surface can keep physical and chemical states suitable for yielding sufficient electrochemical characteristics.

Since the carbon material for an electrode in accordance with the present invention is subjected to the high-frequency thermal plasma processing, a turbostratic structure is formed near the material surface, and the minute amounts of oxygen and hydrogen on the material surface are eliminated, whereby the surface is modified. Since the plasma processing is carried out in the plasma gas atmosphere in particular, the SEI generating reaction is made favorable, and the SEI can improve its stability. Also, the irreversible capacity occurring when the SEI is generated can sufficiently be reduced.

Therefore, from the foregoing viewpoints, an electrode and electrochemical device which can yield sufficient electrochemical characteristics can be obtained when a composite particle for an electrode formed by using the carbon material is employed as a constituent material. In particular, the reversible capacity and charging/discharging efficiency (initial charging/discharging efficiency) of the electrode and electrochemical device can be improved.

Here, "high-frequency thermal plasma" is a plasma generated from a middle pressure (about 10 to 70 kPa) to 1 atm. Since plasmas approximating a thermal equilibrium can be obtained unlike normal low-pressure plasmas, not only a local reaction is effected by plasmas and the like, but also substances existing in the system can attain a high temperature. Therefore, the high-frequency thermal plasma enables both the generation of a high-temperature phase and the surface modification. Examples of specific phenomena seem to include surface nitrogenization when $N_2$ is used for the plasma gas, surface hydrogenization when $H_2$ is used for the plasma gas, physical destruction at an atomic level, and particle surface cleaning.

When using the high-frequency thermal plasma for surface-processing a particle made of a carbonaceous material, a material (a particle made of a carbonaceous material) of the particle made of a carbonaceous material is graphitized by ultrahigh-temperature processing using a high-frequency thermal plasma atmosphere, and the resulting surface is bombarded with ions, radicals, etc., so as to be modified. Here, "carbonaceous material" refers to one which becomes a carbon material having an electronic conductivity when subjected to the high-frequency thermal plasma processing. It is not always necessary for the carbonaceous material to have an electronic conductivity by itself. The carbonaceous material in this case includes not only carbon materials, but also resin materials containing carbon as a constituent element. Examples of the carbonaceous material include graphite, pitch type materials, coconut shells, and phenol resin.

In the method of making a composite particle for an electrode using the plasma processing step, because of such high-frequency thermal plasma processing, a surface state suitable for yielding sufficient electrochemical characteristics seems to be realized such that the carbon material to become a constituent material of an electrode obtained by the plasma processing step has a turbostratic structure near the material surface, and the minute amounts of oxygen and hydrogen react with the surface, whereby new functional groups are introduced, etc.

Preferably, in the present invention, the granulating step is carried out according to spray drying. This can yield an electrode having a uniform density and the like while lowering the irreversible capacity.

Preferably, the granulating step in accordance with the present invention comprises a material liquid preparing step of preparing a material liquid containing the binder, the conductive auxiliary agent, and a solvent; a fluidizing step of putting a particle made of the electrode active material into a fluidizing tank and causing the particle made of the electrode active material to form a fluidized layer; and a spraying/drying step of spraying the material liquid into the fluidized layer containing the particle made of the electrode active material so that the material liquid is attached to the particle made of the electrode active material and is dried, so as to remove the solvent from the material liquid attached to a surface of the particle made of the electrode active material, and cause the binder to bring the particle made of the electrode active material and a particle made of the conductive auxiliary agent into close contact with each other.

When the preferred granulating step is employed, a particle in which the conductive auxiliary agent, electrode active material, and binder are in close contact with each other while in respective quite favorable dispersion states can be obtained more reliably and easily. This composite particle is used as a main ingredient of a powder when an active material containing layer of an electrode is made by a dry method which will be explained later, or as a constituent material of a coating liquid or kneaded product when an active material containing layer of an electrode is formed by a wet method which will be explained later.

Within the composite particle, a quite favorable electron conduction path (electron conduction network) is constructed three-dimensionally. In the case where the composite particle is used as a main ingredient of a powder when making the active material containing layer of the electrode by the dry method which will be explained later, the structure of the electron conduction path can substantially keep its initial state even after forming the active material containing layer by heat treatment. In the case where the composite particle is used as a constituent material of a coating liquid or kneaded product when forming the active material containing layer of the electrode by the wet method which will be explained later, the structure of the electron conduction path can substantially keep its initial state easily even after preparing the coating liquid or kneaded product containing the composite particle if the preparing condition is adjusted (e.g., a dispersant or solvent for preparing the coating liquid is selected).

Hence, from the foregoing viewpoints, an electrode and electrochemical device which can attain sufficient electrochemical characteristics can be obtained when the resulting composite particle is used as a constituent material even if the binder is used as a constituent material.

The configuration in which the above-mentioned preferred granulating step is employed and carried out in the inert gas atmosphere, and the above-mentioned effects exhibited thereby are based on the following inventors' findings.

Namely, the inventors have found that, since the conventional electrode forming methods employ the above-mentioned method using a coating liquid (slurry) or kneaded product containing at least the electrode active material, conductive auxiliary agent, and binder when forming an electrode, the occurrence of the above-mentioned problems is greatly influenced by the state of dispersion of the electrode active material, conductive auxiliary agent, and binder failing to construct an effective conduction network, e.g., a nonuniform dispersion state, in the active material containing layer in the resulting electrode.

The conventional methods using a coating liquid or kneaded product such as that of the composite particle disclosed in Japanese Patent Application Laid-open No. HEI 2-262243, for example, apply the coating liquid or kneaded product to a surface of a collector member, so as to form a coating film made of the coating liquid or kneaded product on the surface, and the coating film is dried, so as to eliminate the solvent, whereby an active material containing layer is formed. The inventors have found that, in the process of drying the coating film, the conductive auxiliary agent and binder having a low specific gravity float up to the vicinity of the coating film surface, whereby the state of dispersion of the electrode active material, conductive auxiliary agent, and binder becomes a state failing to construct an effective conduction network, e.g., a nonuniform dispersion state, thus making the electrode active material, conductive auxiliary agent, and binder fail to attain a sufficient adhesion therebetween, by which no favorable electron conduction path can be constructed in the resulting active material containing layer.

In addition, the composite particle disclosed in Japanese Patent Application Laid-Open No. HEI 2-262243 has a low mechanical strength, so that the carbon material powder immobilized on the surface of a manganese dioxide particle in the process of forming an electrode is easy to peel off. This easiness of peeling is one of reasons why the dispersibility of the carbon material powder in the resulting electrode is likely to become insufficient, whereby electrode characteristics cannot be improved as reliably and sufficiently as expected.

The positive electrode mix for an organic electrolytic solution battery disclosed in Japanese Patent Application Laid-Open No. 2000-40504 is made as a mass (composite particle) constituted by a positive electrode active material, a conductive agent, and a binder by spray drying a slurry comprising a solvent into hot air. In this case, the inventors have found that drying and solidification proceed while the positive electrode active material, conductive agent, and binder are dispersed in the solvent, whereby the conductive agent and binder do not come into close contact with the surface of the particle made of the positive electrode active material constituting the resulting mass (composite particle) while keeping their respective effective conduction networks and being sufficiently dispersed.

More specifically, as shown in FIG. 25, the inventors have found that particles made of the positive electrode active material constituting a resulting mass (composite particle) P100 in the technique disclosed in Japanese Patent Application Laid-Open No. 2000-40504 include a large amount of particles P11 surrounded by only aggregates P33 constituted by the large binder and are electrically isolated without being used in the mass (composite particle) P100. The inventors have also found that, when particles made of the conductive agent form aggregates during drying, particles made of the conductive agent are unevenly distributed as aggregates P22, so that no sufficient electron conduction path (electron conduction network) can be constructed in the mass (composite particle) P100, whereby no sufficient electronic conductivity can be obtained. The inventors have further found that aggregates P22 of particles made of the conductive agent may be surrounded with only the aggregates P33 made of the large binder, so as to be electrically isolated, whereby no sufficient electron conduction path (electron conduction network) can be constructed in the mass (composite particle) P100, and no sufficient electronic conductivity can be obtained from this viewpoint as well.

Namely, in conventional methods of granulating a slurry by spray drying such as that of the composite particle disclosed in Japanese Patent Application Laid-Open No. 2000-40504, the same slurry contains a positive electrode active material (cathode active material), a conductive agent (conductive auxiliary agent), and a binder, whereby the state of dispersion of the electrode active material, conductive auxiliary agent, and binder in the resulting granule (composite particle) depends on the state of dispersion of the electrode active material, conductive auxiliary agent, and binder in the slurry (the state of dispersion of the electrode active material, conductive auxiliary agent, and binder in the process of drying droplets of the slurry in particular). Therefore, the aggregations and uneven distributions of the binder and conductive auxiliary agent mentioned above with reference to FIG. 25 occur, so that the dispersion state of the electrode active material, conductive auxiliary agent, and binder in the resulting granule (composite particle) becomes a state failing to construct an effective conduction network, e.g., a nonuniform dispersion state, whereby no sufficient adhesion is attained between the electrode active material, conductive auxiliary agent, and binder, and no favorable electronic conduction path is constructed in thus obtained active material containing layer.

The inventors have also found that such a case makes it impossible to bring the conductive auxiliary agent and binder into contact with an electrolytic solution, and disperse them selectively and favorably to the surface of an electrode active material which can be involved in an electrode reaction, whereby there is an inutile amount of the conductive auxiliary agent not contributing to constructing an electronic conduction network which efficiently transmit electrons occurring in reaction fields, and there is an inutile amount of the binder merely increasing the electric resistance.

The inventors have further found that, in the conventional techniques such as those for the composite particles of Japanese Patent Application Laid Open Nos. HEI 2-262243 and 2000-40504, the state of dispersion of the electrode active material, conductive auxiliary agent, and binder in the coating liquid becomes uneven, whereby the adhesion of the electrode active material and conductive auxiliary agent to the collector is not sufficiently obtained. In particular, the problem of the state of the dispersion of the electrode active material, conductive auxiliary agent, and binder in the coating liquid and the electrode obtained therefrom becoming uneven and these ingredients being distributed unevenly in the electrode becomes remarkable when the electrode is made thicker.

Conventional electrodes such as the composite particles disclosed in Japanese Patent Application Laid-Open Nos. HEI 2-262243 and 2000-40504 use an insulating or poorly electronically conductive binder together with the electrode active material and conductive auxiliary agent from the viewpoint of securing the stability in forms of electrodes, and thus fail to ensure the electronic conductivity of electrodes sufficiently. The inventors have further found that the problems mentioned above occur in the case of making electrodes by using the composite particles disclosed in Japanese Patent Application Laid-Open Nos. HEI 2-262243 and 2000-40504, since the binder is also employed therein.

The problems mentioned above also occur in those having electrodes made by the conventional general manufacturing method (wet method), i.e., the method using a coating liquid or kneaded product containing, at least, the electrode active material, conductive auxiliary agent, and binder, in primary and secondary batteries of species other than the above-mentioned lithium ion secondary battery.

Further, problems similar to those mentioned above occur in capacitors (e.g., electrochemical capacitors such as electric double layer capacitors) and electrolytic cells having an electrode made by a method using a coating liquid or kneaded product containing at least a conductive auxiliary agent, a binder, and an electronically conductive material (carbon material or metal oxide) in place of the electrode active material in the batteries.

In spite of a general understanding of one skilled in the art that the internal resistance of an electrode (or a composite particle to become a constituent material thereof) tends to increase when the electrode (or a composite particle to become a constituent material thereof) is formed while using a binder, the present invention can yield unexpected results by employing the above-mentioned preferred granulating step and performing the granulating step in an inert gas atmosphere.

Namely, when the composite particle containing electrode active material, conductive auxiliary agent, and binder is formed beforehand by way of the above-mentioned preferred granulating step and is used as an electrode, the electrode (composite particle) having a specific resistance value (or an internal resistance value normalized with an apparent volume) sufficiently lower than that of the electrode active material itself can be constructed, though it contains the binder.

Employing the above-mentioned preferred granulating step can more reliably form the above-mentioned composite particle in which a quite favorable electron conduction path (electron conduction network) is constructed three-dimensionally.

The electrode formed by using the composite particle for an electrode obtained by way of the above-mentioned preferred granulating step is formed while in a state keeping the structure of the above-mentioned composite particle, whereby the state where "the electrode active material and the conductive auxiliary agent are electrically connected to each other without being isolated" is realized in the active material containing layer. Therefore, a quite favorable electron conduction path (electron conduction network) is three-dimensionally constructed in the active material containing layer.

Here, "the electrode active material and the conductive auxiliary agent are electrically connected to each other without being isolated in the composite particle" indicates that a particle made of the electrode active material (or its aggregate) and a particle made of the conductive auxiliary agent (or its aggregate) are electrically connected to each other without "substantially" being isolated in the active material containing layer. More specifically, it indicates that the particle made of the electrode active material (or its aggregate) and the particle made of the conductive auxiliary agent (or its aggregate) are electrically connected to each other not without completely being isolated, but to such an extent that an electric resistance at a level where effects of the present invention can be achieved.

The state where "the electrode active material and the conductive auxiliary agent are electrically connected to each other without being isolated in the composite particle" can be verified by SEM (Scanning Electron Microscope) and TEM (Transmission Electron Microscope) photographs and analysis data of EDX (Energy Dispersive X-ray Fluorescence Spectrometer) of cross sections of the composite particle of the electrode in accordance with the present invention. When the SEM and TEM photographs and EDX analysis data of cross sections in the composite particle of the electrode in accordance with the present invention are compared with those of a conventional electrode (or composite particle), the electrode in accordance with the present invention can clearly be distinguished from the conventional electrode (or composite particle).

More specifically, since minute droplets of the material liquid containing the conductive auxiliary agent and binder are directly sprayed to particles made of the electrode active material in the fluidizing tank in the above-mentioned granulating step, the aggregation of constituent particles constituting the composite particle can fully be prevented from advancing, whereby constituent particles in the resulting particle can sufficiently be kept from being distributed unevenly. Also, the conductive auxiliary agent and binder can be brought into contact with the electrolytic solution, so as to be dispersed selectively and favorably over the surface of the electrode active material which can be involved in electrode reactions.

Therefore, the composite particle becomes a particle in which the conductive auxiliary agent, electrode active material, and binder are in close contact with each other while in respective quite favorable dispersion states. The particle size and form of the composite particle in accordance with the present invention can arbitrarily be controlled by regulating the temperature in the fluidizing tank, the amount of the material liquid sprayed in the fluidizing tank, the amount of the electrode active material put into a fluid flow (e.g., gas flow) generated in the fluidizing tank, the speed of the fluidized layer, the mode (laminar flow, turbulent flow, etc.) of the flow (circulation) of the fluidized layer (fluid flow), etc.

Thus, it will be sufficient if the above-mentioned granulating step can directly spray droplets of the material liquid containing the conductive auxiliary agent and the like to fluidized particles. Therefore, the fluidizing method is not restricted in particular. For example, a fluidizing tank generating a gas flow, by which particles are fluidized, a fluidizing tank which fluidizes particles in a rotary fashion with a stirring blade, and a fluidizing tank which fluidizes particles by vibration can be used. From the viewpoints of improving the drying efficiency and making the form/size of the resulting composite particle uniform in the method of making a composite particle for an electrode, it will be preferred if the fluidizing step generates a gas flow in the fluidizing tank, and puts a particle made of the electrode active material into the gas flow, so as to fluidize the particle made of the electrode active material.

The inventors presume that a quite favorable electron conduction path (electron conduction network) is three-dimensionally constructed within thus obtained composite particle, whereby an electron conduction path (electron conduction network) much better than that in conventional electrodes is three-dimensionally constructed within the electrode (composite particle) employed in the electrochemical device in accordance with the present invention.

From the viewpoint of forming the composite particle having the structure mentioned above more easily and more reliably, it is preferred in the present invention that the granulating step adjust the temperature in the fluidizing tank to a temperature of at least 50° C. but not greatly exceeding the melting point of the binder, more preferably at least 50° C. but not higher than the melting point of the binder. Though depending on the species of the binder, the melting point of the binder is about 200° C., for example. When the temperature in the fluidizing tank is less than 50° C., the drying of the solvent in the spray is more likely to become insufficient. When the temperature in the fluidizing tank greatly exceeds the melting point of the binder, the binder is more likely to melt and greatly hinder particles from forming. When the temperature in the fluidizing tank is slightly higher than the melting point of the binder, the problem mentioned above can sufficiently be prevented from occurring, though depending on conditions. When the temperature in the fluidizing tank is not higher than the melting point of the binder, the above-mentioned problem does not occur.

From the viewpoint of forming the composite particle having the structure mentioned above more easily and more reliably, it is preferred in the present invention that the gas flow generated in the fluidizing tank in the granulating step be a gas flow comprising an inert gas. Preferably, in the granulating step, the humidity (relative humidity) in the fluidizing tank is a dew point of −40° C. or lower within the preferred temperature range mentioned above. As mentioned above, "inert gas" refers to a gas belonging to noble gases and nitrogen gas.

It is preferred in the present invention that the solvent contained in the material liquid be a solvent adapted to dissolve or disperse the binder and disperse the conductive auxiliary agent. This can also enhance the dispersibility of the binder, conductive auxiliary agent, and electrode active material in the resulting composite particle. From the viewpoint of further enhancing the dispersibility of the binder, conductive auxiliary agent, and electrode active material in the composite particle, it will be preferred if the solvent contained in the material liquid is adapted to dissolve the binder and disperse the conductive auxiliary agent.

From the viewpoint of enhancing the dispersibility of the binder, conductive auxiliary agent, and electrode active material in the composite particle more reliably, it is preferred in the present invention that the solvent contained in the material liquid have a moisture content of 100 ppm or less. When the moisture content in the solvent exceeds 100 ppm, the moisture adsorbed by the composite particle increases so much that the loss caused by side reactions in electrochemical reactions tends to increase.

The present invention may further comprise a particle storing step of encapsulating the composite particle for an electrode obtained after the granulating step into a case capable of storing the composite particle in a closed state in the inert gas atmosphere. This can more reliably keep the purified surface of the electrode active material (carbon material or metal oxide) contained in the manufactured composite particle for an electrode.

In another aspect, the present invention provides a method of making an electrode comprising, at least, a conductive active material containing layer containing an electrode active material and a conductive collector disposed in a state electrically in contact with the active material containing layer, the method comprising a composite particle forming step including a granulating step of integrating a conductive auxiliary agent and a binder adapted to bind the conductive auxiliary agent and the electrode active material together with a particle made of the electrode active material while in close contact with each other in an inert gas atmosphere so as to form a composite particle for an electrode containing the electrode active material, conductive auxiliary agent, and binder; and an active material containing layer forming step of forming an active material containing layer at a part to be formed with the active material containing layer in the collector in the inert gas atmosphere by using the composite particle.

When the active material containing layer is formed by the particle for an electrode obtained by the above-mentioned method of making a composite particle for an electrode as such, an electrode having excellent electrode characteristics can be obtained.

When the particle made of the electrode active material is a particle mainly composed of a carbon material having an electronic conductivity, it will be preferred if the composite particle forming step in the method of making an electrode in accordance with the present invention further comprises a plasma processing step of subjecting a material made of a carbonaceous material to high-frequency thermal plasma processing in a plasma gas atmosphere so as to yield a particle made of an electrode active material having an electronic conductivity, whereas it will be preferred if the granulating step is a step of integrating the conductive auxiliary agent and the binder with the particle made of the electrode active material obtained after the plasma processing step in close contact with each other in the inert gas atmosphere so as to form the composite particle for an electrode containing the electrode active material, conductive auxiliary agent, and binder.

When the plasma processing step is provided, and the granulating step using the particle made of the electrode active material obtained by the plasma processing step is carried out in the inert gas atmosphere as such, an electrode having sufficient electrode characteristics and electrochemical characteristics can be obtained effectively. In particular, the irreversible capacity of the resulting electrode can sufficiently be reduced.

Though the composite particle forming step may include steps other than the granulating step, it will be preferred if all the manufacturing steps after the plasma processing step are carried out in the inert gas atmosphere.

Preferably, the granulating step in the method of making an electrode in accordance with the present invention comprises a material liquid preparing step of preparing a material liquid containing the binder, the conductive auxiliary agent, and a solvent; a fluidizing step of putting a particle made of the electrode active material into a fluidizing tank and causing the particle made of the electrode active material to form a fluidized layer; and a spraying/drying step of spraying the material liquid into the fluidized layer containing the particle made of the electrode active material so that the material liquid is attached to the particle made of the electrode active material and is dried, so as to remove the solvent from the material liquid attached to a surface of the particle made of the electrode active material, and cause the binder to bring the particle made of the electrode active material and a particle made of the conductive auxiliary agent into close contact with each other.

Employing the above-mentioned preferred granulating step as such can effectively yield an electrode having excellent electrode characteristics even when a binder resin is used in a constituent material. When the above-mentioned plasma processing step is introduced, the irreversible capacity can further be reduced.

The active material containing layer forming step in the method of making an electrode in accordance with the present invention may comprise a sheet forming step of subjecting a powder containing at least the composite particle to heating and pressing so as to yield a sheet containing at least the composite particle; and an active material containing layer arranging step of arranging the sheet as the active material containing layer on the collector. Even when employing a dry method as such while using the binder in the above-mentioned constituent material, an electrode which can attain excellent electrode characteristics and an electrode having such excellent electrode characteristics that the irreversible capacity can sufficiently be lowered can be obtained more reliably.

Here, "powder containing at least the composite particle" may be constituted by the composite particle alone. The "powder containing at least the composite particle" may further contain the binder and/or the conductive auxiliary agent. When the powder contains constituents other than the composite particle, it will be preferred if the content of the composite particle in the powder is at least 80 mass % on the basis of the total mass of the powder.

Preferably, in the method of making an electrode in accordance with the present invention, the sheet forming step is carried out by using a hot roll press. The hot roll press has a pair of hot rolls, between which the "powder containing at least the composite particle" is fed, heated, and pressed, so as to form a sheet. As a consequence, the sheet to become the active material containing layer can be formed easily and reliably.

Though the active material containing layer may be formed by the dry method using the composite particle in the active material containing layer forming step in the method of making an electrode in accordance with the present invention as in the foregoing, effects of the present invention mentioned above can also be obtained when the active material containing layer is formed by the wet method as follows.

Namely, the active material containing layer forming step in the method of making an electrode in accordance with the present invention may comprise a coating liquid preparing step of preparing an electrode forming coating liquid by adding the composite particle to a liquid adapted to disperse or knead the composite particle; a step of applying the electrode forming coating liquid to the part to be formed with the active material containing layer in the collector; and a step of solidifying a liquid film constituted by the electrode forming coating liquid applied to the part to be formed with the active material containing layer in the collector.

Even when a binder is used as a constituent material, an electrode which can attain excellent electrode characteristics and an electrode having excellent electrode characteristics which can sufficiently lower the irreversible capacity can be obtained easily and reliably in this case as well. Here, "liquid adapted to disperse the composite particle" is preferably a liquid which does not dissolve the binder in the composite particle, but may have a characteristic of partly dissolving the binder near the surface of the composite particle as long as the electric contact between composite particles can sufficiently be secured and effects of the present invention can be achieved. As long as effects of the present invention can be obtained, the binder and conductive auxiliary agent may further be added to the composite particle as other ingredients of the composite particle. The binder added here is one which is soluble in the "liquid adapted to disperse the composite particle".

When a liquid adapted to knead the composite particle is used, the active material containing layer forming step may comprise a kneaded product preparing step of preparing a kneaded product preparing step of preparing an electrode forming kneaded product containing the composite particle by adding the composite particle to the liquid; a step of applying the electrode forming kneaded product to the part to be formed with the active material containing layer in the collector; and a step of solidifying a coating film constituted by the electrode forming kneaded product applied to the part to be formed with the active material containing layer in the collector.

Even when a binder is used as a constituent material, an electrode which can attain excellent electrode characteristics and an excellent electrode which can sufficiently lower the irreversible capacity can be obtained easily and reliably in this case as well.

Preferably, the method of making an electrode in accordance with the present invention further comprises an electrode storing step of encapsulating the electrode obtained after the active material containing layer forming step into a case capable of storing the composite particle in a closed state in the inert gas atmosphere. This can more reliably keep the purified surface of the electrode active material (carbon material or metal oxide) contained in the composite particle for an electrode contained in the manufactured electrode.

In still another aspect, the present invention provides a method of making an electrochemical device comprising, at least, an anode, a cathode, and an electrolyte layer having an ionic conductivity, the anode and cathode opposing each other by way of the electrolyte layer, the method comprising an electrode forming step of forming an electrode by way of a composite particle forming step including a granulating step of integrating a conductive auxiliary agent and a binder adapted to bind the conductive auxiliary agent and an electrode active material together with a particle made of the electrode active material while in close contact with each other in an inert gas atmosphere so as to form a composite particle for an electrode containing the electrode active material, conductive auxiliary agent, and binder; and an active material containing layer forming step of forming an active material containing layer at a part to be formed with the active material containing layer in the collector in the inert gas atmosphere by using the composite particle; wherein the electrode obtained by the electrode forming step is used as at least one of the anode and cathode.

When the electrode obtained by the above-mentioned method of making an electrode in accordance with the present invention is used as at least one, preferably both, of the anode and cathode, an electrochemical device having excellent charging/discharging characteristics which can sufficiently lower the irreversible capacity can be obtained easily and reliably.

In the specification, "electrochemical device" refers to one comprising, at least, a first electrode (anode) and a second electrode (cathode) which oppose each other, and an electrolyte layer having an ionic conductivity disposed between the first and second electrodes. The "electrolyte layer having an ionic conductivity" is any of (1) a porous separator formed from an insulating material, which is immersed with an electrolytic solution (or a gel-like electrolyte obtained by adding a gelling agent to an electrolytic solution); (2) a solid electrolyte film (a film made of a solid polymer electrolyte or a film containing an ionically conductive inorganic material); (3) a layer made of a gel-like electrolyte obtained by adding a gelling agent to an electrolytic solution; and (4) a layer made of an electrolytic solution.

In any of the configurations of (1) to (4), the first and second electrodes may contain therewithin their respective electrolytes to be used.

In the specification, a laminate constituted by the first electrode (anode), electrolyte layer, and second electrode (cathode) in each of the configurations of (1) to (3) is referred to as "matrix" when necessary. The matrix includes not only those having a three-layer structure as those of the configurations of (1) to (3), but also those with five or more layers constituted by alternately laminated electrodes and electrolyte layers.

In any of the configurations of (1) to (4), the electrochemical device may have a configuration of a module in which a plurality of unit cells are arranged in series or parallel within a case.

In the electrochemical device obtained by the method of making an electrochemical device, the electrolyte layer may comprise a solid electrolyte. In this case, it will be preferred if the solid electrolyte comprises a ceramic solid electrolyte, a solid polymer electrolyte, or a gel-like electrolyte obtained by adding a gelling agent to a liquid electrolyte.

In this case, an electrochemical device in which all the constituents are solid (e.g., so-called "all-solid battery") can be constructed. This can easily reduce the weight of the electrochemical device and improve energy density and safety.

Constructing the "all-solid battery" (all-solid lithium ion secondary battery in particular) as the electrochemical device yields the following advantages (I) to (IV). (I) Since the electrolyte layer is not made of a liquid electrolyte but a solid electrolyte, no leakage occurs, so that an excellent resistance to heat (high-temperature stability) can be obtained, whereby electrolyte components and electrode active materials can sufficiently be prevented from reacting with each other. Therefore, the battery can achieve excellent safety and reliability. (II) Metal lithium, which has been hard to use with an electrolyte layer made of a liquid electrolyte, can easily be employed as an anode (to construct a so-called "metal lithium secondary battery"), whereby energy density can further be improved. (III) When constructing a module in which a plurality of unit cells are arranged in a case, the plurality of unit cells can be connected in series, which has been unrealizable with an electrolyte layer made of a liquid electrolyte. Therefore, modules having various output voltages, relatively high output voltages in particular, can be constructed. (IV) As compared with one equipped with an electrolyte layer made of a liquid electrolyte, the degree of freedom in the form of batteries employable can be enhanced, and the battery can be constructed compact more easily. Therefore, the battery can easily be adapted to conditions of placement (e.g., the position where the battery is placed, and the size, form, etc. of a space where the battery is placed) in a device such as a portable instrument in which the battery is mounted as a power supply.

In the method of making an electrochemical device in accordance with the present invention, the electrolyte layer may comprise a separator made of an insulating porous body, and a liquid electrolyte or solid electrolyte infiltrated in the separator. When the solid electrolyte is used, a ceramic solid electrolyte, a solid polymer electrolyte, or a gel-like electrolyte obtained by adding a gelling agent to a liquid electrolyte can be used in this case as well.

When the particle made of the electrode active material is a particle mainly composed of a carbon material having an electronic conductivity, it will be preferred if the composite particle forming step in the method of making an electrochemical device in accordance with the present invention further comprises a plasma processing step of subjecting a material made of a carbonaceous material to high-frequency thermal plasma processing so as to yield a particle made of an electrode active material having an electronic conductivity in a plasma gas atmosphere, whereas it will be preferred if the granulating step is a step of integrating the conductive auxiliary agent and the binder with the particle made of the electrode active material obtained after the plasma processing step in close contact with each other in the inert gas atmosphere so as to form the composite particle for an electrode containing the electrode active material, conductive auxiliary agent, and binder.

When the plasma processing step is provided, and the granulating step using the particle made of the electrode active material obtained by the plasma processing step is carried out in the inert gas atmosphere as such, an electrode having sufficient electrode characteristics and electrochemical characteristics can be obtained effectively. In particular, the irreversible capacity of the resulting electrode can sufficiently be reduced.

Though the composite particle forming step may include steps other than the granulating step, it will be preferred if all the manufacturing steps after the plasma processing step are carried out in the inert gas atmosphere.

Preferably, the granulating step in the method of making an electrochemical device in accordance with the present invention comprises a material liquid preparing step of preparing a material liquid containing the binder, the conductive auxiliary agent, and a solvent; a fluidizing step of putting a particle made of the electrode active material into a fluidizing tank and causing the particle made of the electrode active material to form a fluidized layer; and a spraying/drying step of spraying the material liquid into the fluidized layer containing the particle made of the electrode active material so that the material liquid is attached to the particle made of the electrode active material and is dried, so as to remove the solvent from the material liquid attached to a surface of the particle made of the electrode active material, and cause the binder to bring the particle made of the electrode active material and a particle made of the conductive auxiliary agent into close contact with each other.

Employing the above-mentioned preferred granulating step as such can effectively yield an electrode having excellent electrode characteristics even when a binder resin is used in a constituent material. When the above-mentioned plasma processing step is introduced, the irreversible capacity can further be reduced.

In still another aspect, the present invention provides an apparatus for making a composite particle for an electrode, the apparatus comprising a granulating part for carrying out a granulating process of integrating a conductive auxiliary agent and a binder adapted to bind the conductive auxiliary agent and an electrode active material together with a particle made of the electrode active material while in close contact with each other in an inert gas atmosphere so as to form a composite particle for an electrode containing the electrode active material, conductive auxiliary agent, and binder; and an inert gas atmosphere forming device for carrying out the granulating process in the inert gas atmosphere.

Since the apparatus for making a composite particle for an electrode in accordance with the present invention comprises the granulating part and the inert gas atmosphere forming device operating according to the method of making a composite particle for an electrode in accordance with the present invention, the method of making a composite particle for an electrode can be carried out effectively. Therefore, even when a binder is used as a constituent material, a composite particle for an electrode which can easily and reliably form an electrode which can attain excellent electrode characteristics, and a composite particle for an electrode which can sufficiently lower the irreversible capacity can be obtained easily and reliably.

When the particle made of the electrode active material is a particle mainly composed of a carbon material having an electronic conductivity, it will be preferred if the apparatus for making a composite particle for an electrode in accordance with the present invention further comprises a plasma processing part for carrying out a plasma processing process of subjecting a material made of a carbonaceous material to high-frequency thermal plasma processing in a plasma gas atmosphere so as to yield a particle made of an electrode active material having an electronic conductivity, whereas it will be preferred if the granulating part is a granulating part for carrying out a granulating process of integrating the conductive auxiliary agent and the binder with the particle made of the electrode active material obtained after the plasma processing step in close contact with each other in the inert gas atmosphere so as to form the composite particle for an electrode containing the electrode active material, conductive auxiliary agent, and binder.

When the plasma processing part is provided, the particle made of the electrode active material obtained in the plasma processing part is fed to the granulating part, and the granulating step in accordance with the present invention is carried out in the inert gas atmosphere as such, a composite particle for an electrode which can easily and reliably form an electrode which can attain excellent electrode characteristics, and a composite particle for an electrode which can sufficiently lower the irreversible capacity can be obtained easily and reliably even if a binder is used as a constituent material.

Preferably, the apparatus for making a composite particle for an electrode in accordance with the present invention further comprises a particle storing part for carrying out a particle storing step of encapsulating the composite particle for an electrode obtained after the granulating step into a case capable of storing the composite particle in a closed state in the inert gas atmosphere. This can more reliably keep the purified surface of the electrode active material (carbon material or metal oxide) contained in the manufactured composite particle for an electrode.

In still another aspect, the present invention provides an apparatus for making an electrode comprising, at least, a conductive active material containing layer containing an electrode active material and a conductive collector disposed in a state electrically in contact with the active material containing layer, the apparatus comprising a granulating part for carrying out a granulating step of integrating a conductive auxiliary agent and a binder adapted to bind the conductive auxiliary agent and the electrode active material together with a particle made of the electrode active material while in close contact with each other in an inert gas atmosphere so as to form a composite particle for an electrode containing the electrode active material, conductive auxiliary agent, and binder; an active material containing layer forming part for forming the active material containing layer at a part to be formed with the active material containing layer in the collector by using the composite particle; and an inert gas atmosphere forming device for carrying out the processes in the granulating part and active material containing layer forming part in the inert gas atmosphere.

Since the apparatus for making an electrode in accordance with the present invention comprises the granulating part, active material containing layer forming part, and inert gas atmosphere forming device operating according to the above-mentioned method of making a composite particle for an electrode and method of making an electrode in accordance with the present invention, the method of making an electrode in accordance with the present invention can be carried out effectively, whereby an electrode having excellent electrode characteristics can be obtained easily and reliably even when a binder is used as a constituent material.

When the particle made of the electrode active material is a particle mainly composed of a carbon material having an electronic conductivity, it will be preferred if the apparatus for making an electrode in accordance with the present invention further comprises a plasma processing part for carrying out a plasma processing step of subjecting a material made of a carbonaceous material to high-frequency thermal plasma processing in a plasma gas atmosphere so as to yield a particle made of an electrode active material having an electronic conductivity, whereas it will be preferred if the granulating part is a granulating part for carrying out a granulating step of integrating the conductive auxiliary agent and the binder with the particle made of the electrode active material obtained after the plasma processing step in close contact with each other so as to form the composite particle for an electrode containing the electrode active material, conductive auxiliary agent, and binder.

When the plasma processing part is provided, the particle made of the electrode active material obtained in the plasma processing part is fed to the granulating part, and the granulating step in accordance with the present invention is carried out in the inert gas atmosphere as such, an electrode having excellent electrode characteristics can be obtained easily and reliably even if a binder is used as a constituent material.

Preferably, the apparatus for making an electrode in accordance with the present invention further comprises an electrode storing part for carrying out a step of encapsulating the electrode obtained after the active material containing layer is formed in the active material containing layer forming part into a case capable of storing the electrode in a closed state in an inert gas atmosphere. This can more reliably keep the purified surface of the electrode active material (carbon material or metal oxide) contained in the composite particle for an electrode contained in the manufactured electrode.

In still another aspect, the present invention provides an apparatus for making an electrochemical device comprising, at least, an anode, a cathode, and an electrolyte layer having an ionic conductivity, the anode and cathode opposing each other by way of the electrolyte layer; the anode and cathode comprising, at least, a conductive active material containing layer containing an electrode active material, and a conductive collector disposed in electric contact with the active material containing layer; the apparatus comprising a granulating part for carrying out a granulating step of integrating a conductive auxiliary agent and a binder adapted to bind the conductive auxiliary agent and the electrode active material together with a particle made of the electrode active material while in close contact with each other in an inert gas atmosphere so as to form a composite particle for an electrode containing the electrode active material, conductive auxiliary agent, and binder; an active material containing layer forming part for forming the active material containing layer at a part to be formed with the active material containing layer in the collector by using the composite particle; a device assembling part for assembling the electrochemical device by using a laminate of the collector and active material containing layer as at least one of electrodes of the anode and cathode; and an inert gas atmosphere forming device for carrying out the processes in the granulating part, active material containing layer forming part, and device assembling part in the inert gas atmosphere.

Since the apparatus for making an electrochemical device in accordance with the present invention comprises the granulating part, active material containing layer forming part, device assembling part, and inert gas atmosphere forming device operating according to the above-mentioned method of making a composite particle for an electrode, method of making an electrode in accordance with the present invention, and method of making an electrochemical device, the method of making an electrochemical device in accordance with the present invention can be carried out effectively, whereby an electrochemical device having excellent charging/discharging characteristics can be obtained easily and reliably even when a binder is used as a constituent material of the electrode.

When the particle made of the electrode active material is a particle mainly composed of a carbon material having an electronic conductivity, it will be preferred if the apparatus for making an electrochemical device in accordance with the present invention further comprises a plasma processing part for carrying out a plasma processing step of subjecting a material made of a carbonaceous material to high-frequency thermal plasma processing in a plasma gas atmosphere so as to yield a particle made of an electrode active material having an electronic conductivity, whereas it will be preferred if the granulating part is a granulating part for carrying out a granulating step of integrating the conductive auxiliary agent and the binder with the particle made of the electrode active material obtained after the plasma processing step in close contact with each other in the inert gas atmosphere so as to form the composite particle for an electrode containing the electrode active material, conductive auxiliary agent, and binder.

When the plasma processing part is provided, the particle made of the electrode active material obtained in the plasma processing part is fed to the granulating part, and the granulating step in accordance with the present invention is carried out in the inert gas atmosphere as such, an electrochemical device having excellent charging/discharging characteristics can be obtained easily and reliably even if a binder is used as a constituent material.

The composite particle for an electrode and electrode obtained by the present invention can be utilized in an electrochemical device, whereas the electrochemical device obtained by the present invention can be used as a backup power supply for a power supply for a portable device (small-sized electronic device) and as an auxiliary power supply for a hybrid car.

BRIEF DESCRIPTION OF THE DRAWINGS

FIG. 25 is a schematic sectional view roughly showing a partial configuration of a conventional composite particle for an electrode, and the internal structure of an active material containing layer of an electrode formed by using the conventional composite particle for an electrode.

DESCRIPTION OF THE PREFERRED EMBODIMENTS

In the following, preferred embodiments of the present invention will be explained in detail with reference to the accompanying drawings. In the following explanation, parts identical or equivalent to each other will be referred to with numerals identical to each other without repeating their overlapping descriptions.

Figure 1:
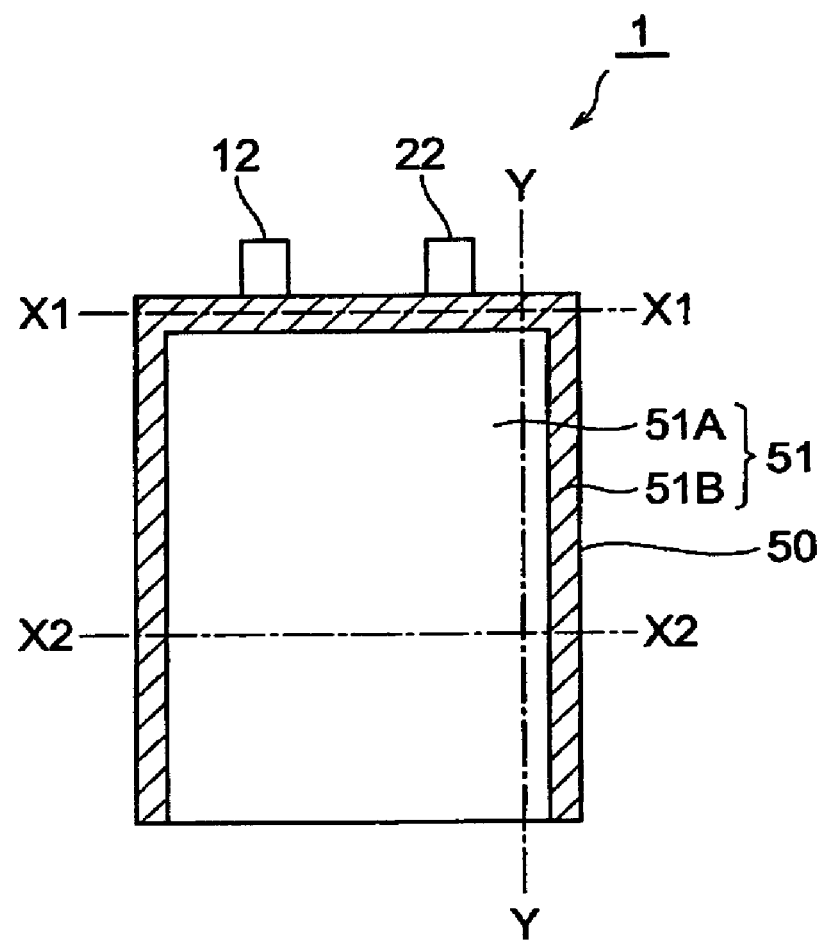
FIG. 1 is a front view showing the basic configuration of an example of the electrochemical device (lithium ion secondary battery) made by a preferred embodiment of the manufacturing method in accordance with the present invention.
Figure 2:
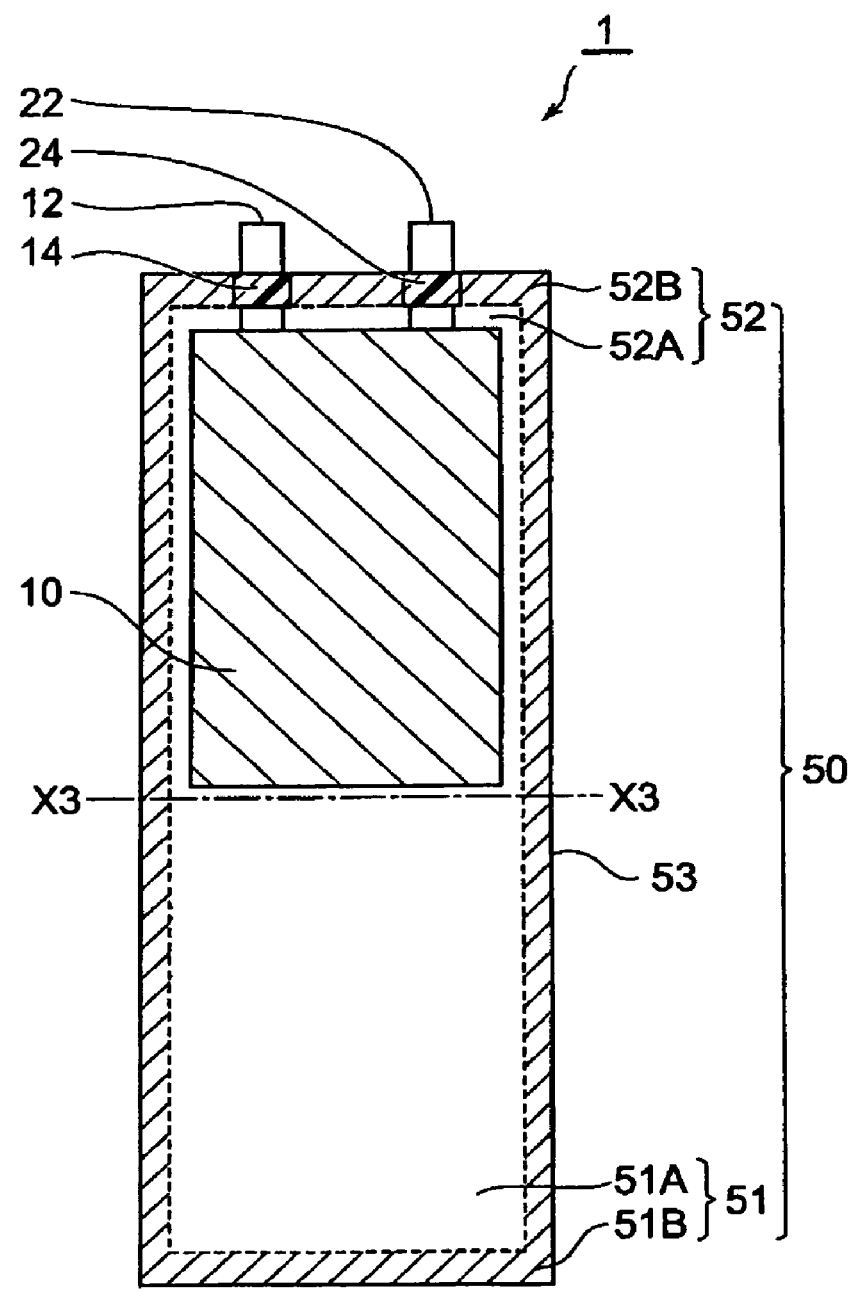
FIG. 2 is a developed view of the inside of the electrochemical device shown in FIG. 1 as seen in a direction normal to a surface of an anode 10.
Figure 3:
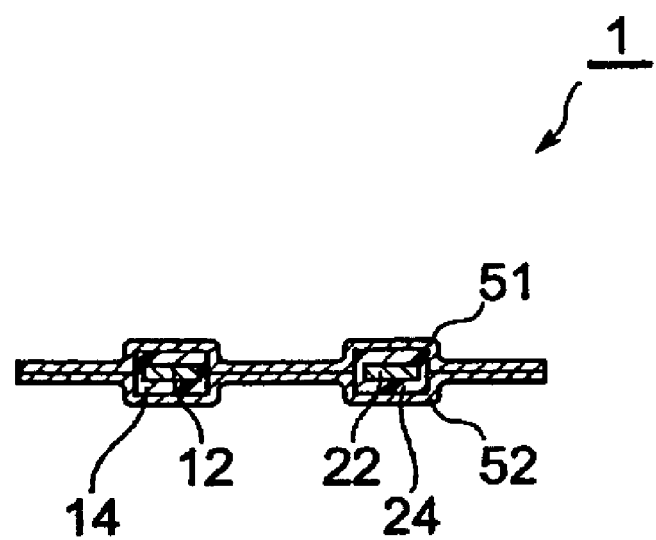
FIG. 3 is a schematic sectional view showing the electrochemical device shown in FIG. 1 taken along the line X1-X1 thereof.
Figure 4:
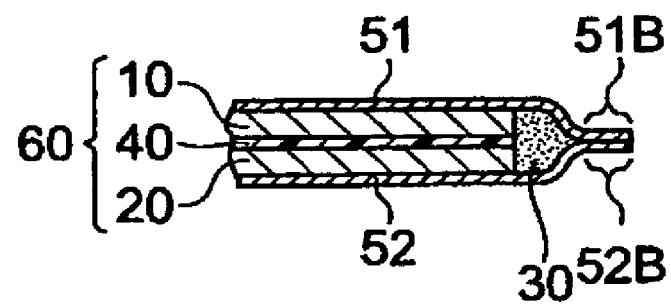
FIG. 4 is a schematic sectional view showing a main part of the electrochemical device shown in FIG. 1 taken along the line X2-X2 thereof.
Figure 5:
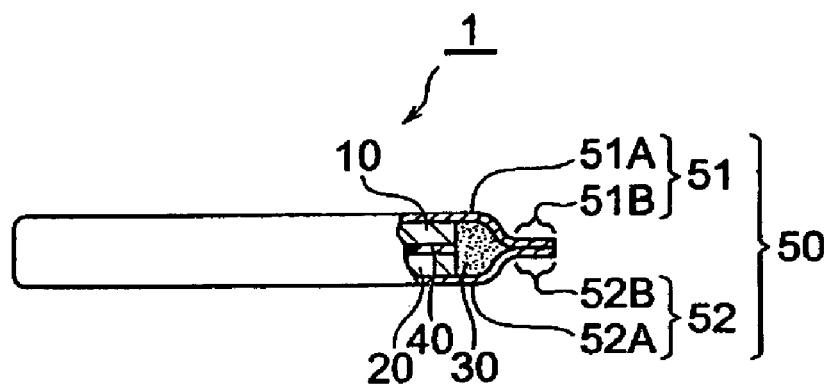
FIG. 5 is a schematic sectional view showing a main part of the electrochemical device shown in FIG. 1 taken along the line Y-Y thereof.

First, a preferred basic configuration of the electrochemical device made by a preferred embodiment of the manufacturing method and apparatus in accordance with the present invention will be explained. FIG. 1 is a front view showing the basic configuration of an example of the electrochemical device (lithium ion secondary battery) made by a preferred embodiment of the manufacturing method in accordance with the present invention. FIG. 2 is a developed view of the inside of the electrochemical device shown in FIG. 1 as seen in a direction normal to a surface of an anode 10. FIG. 3 is a schematic sectional view showing the electrochemical device shown in FIG. 1 taken along the line X1-X1 thereof. FIG. 4 is a schematic sectional view showing a main part of the electrochemical device shown in FIG. 1 taken along the line X2-X2 thereof. FIG. 5 is a schematic sectional view showing a main part of the electrochemical device shown in FIG. 1 taken along the line Y-Y thereof.

As shown in FIGS. 1 to 5, a lithium ion secondary battery 1 is mainly constituted by a planar anode 10 and a planar cathode 20 which oppose each other, a planar electrolyte layer 40 (separator or the like) disposed between the anode 10 and cathode 20 in close contact therewith, a nonaqueous electrolytic solution, a case 50 accommodating them in a closed state, an anode lead 12 having one end part electrically connected to the anode 10 and the other end part projecting out of the case 50, and a cathode lead 22 having one end part electrically connected to the cathode 20 and the other end part projecting out of the case 50. Here, for convenience of explanation, the "anode" 10 and "cathode" 20 are determined with reference to polarities of the lithium ion secondary battery 1 at the time of discharging. Therefore, at the time of charging, the "anode 10" and "cathode 20" become "cathode" and "anode", respectively.

For achieving the objects of the present invention, the lithium ion secondary battery 1 has configurations explained in the following. Constituents in this embodiment will now be explained in detail with reference to FIGS. 1 to 9.

The case 50 is formed by using a pair of films (a first film 51 and a second film 52) opposing each other. Here, as shown in FIG. 2, the first film 51 and second film 52 in this embodiment are connected to each other. Namely, the case 50 in this embodiment is formed by folding a rectangular film made of a single composite package film at a fold line X3-X3 shown in FIG. 2, and bonding a pair of overlying opposed edge parts (an edge part 51B of the first film 51 and an edge part 52B of the second film 52 in the drawing) to each other with an adhesive or by heat sealing.

The first film 51 and second film 52 represent parts having respective surfaces opposing each other formed when a single rectangular film 53 is folded as mentioned above. In this specification, edge parts of the first film 51 and second film 52 after being bonded together will be referred to as "seal parts".

This makes it unnecessary to provide a seal part for bonding the first film 51 and second film 52 to each other at the part of the folding line X3-X3, whereby seal parts in the case 50 can be reduced. As a result, a higher volume energy density can be attained with reference to the volume of the space to place the lithium ion secondary battery 1.

In this embodiment, as shown in FIGS. 1 and 2, the anode lead 12 and cathode lead 22 are arranged such that each has one end projecting out of the seal part where the edge part 51B of the first film 51 and the edge part 52B of the second film 52 are bonded together.

The film constituting the first film 51 and second film 52 is a flexible film as mentioned above. The film is light in weight and easy to form thinner, whereby the lithium ion secondary battery itself can be formed like a thin film. This can easily improve the original volume energy density, and the volume energy density with reference to the volume of the space where the lithium ion secondary battery is to be placed.

The film is not restricted in particular as long as it is a flexible film. From the viewpoint of effectively preventing moisture from entering the inside of the case 50 from the outside and electrolyte components from escaping from the inside of the case 50 to the outside while securing sufficient mechanical strength and lightweight characteristic of the case, however, it will be preferred if the film is a "composite package film" comprising, at least, an innermost layer made of a synthetic resin in contact with the nonaqueous electrolytic solution and a metal disposed on the upper side of the innermost layer.

Figure 6:
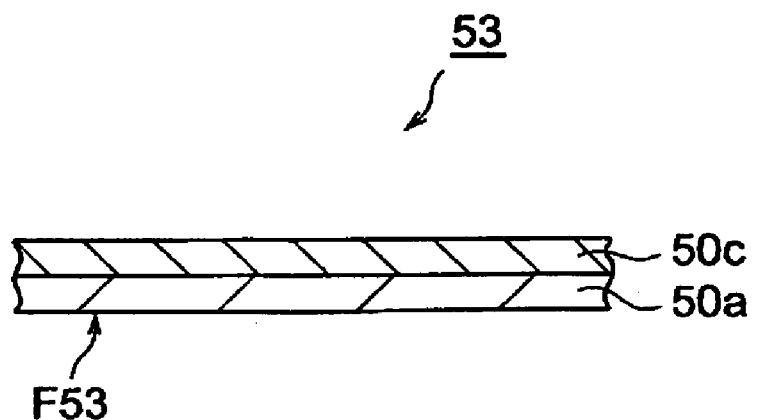
FIG. 6 is a schematic sectional view showing an example of the basic configuration of a film to become a constituent material for a case of the electrochemical device shown in FIG. 1.
Figure 7:
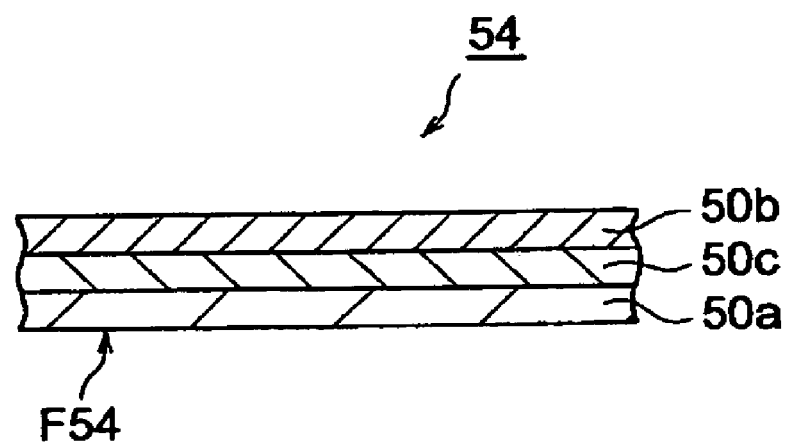
FIG. 7 is a schematic sectional view showing another example of the basic configuration of a film to become a constituent material for a case of the electrochemical device shown in FIG. 1.

Examples of the composite package film usable as the first film 51 and second film 52 include those having respective configurations shown in FIGS. 6 and 7. The composite package film 53 shown in FIG. 6 comprises an innermost layer 50a, made of a synthetic resin, having an inner face F53 in contact with the nonaqueous electrolyte solution; and a metal layer 50c disposed on the other face (outer face) of the innermost layer 50a. On the other hand, the composite package film 54 shown in FIG. 7 has a configuration in which an outermost layer 50b made of a synthetic resin is further disposed on the outer face of the metal layer 50c of the composite package film 53 shown in FIG. 6.

The composite package film usable as the first film 51 and second film 52 is not restricted in particular as long as it is a composite package material comprising at least two layers including at least one synthetic resin layer such as the above-mentioned innermost layer and a metal layer such as a metal foil. From the viewpoint of more reliably yielding the effects mentioned above, however, it will be more preferable if the film is constituted by at least three layers comprising the innermost layer 50a, the outermost layer 50b made of a synthetic resin disposed on the outer face side of the case 50 located farthest from the innermost layer 50a, and at least one metal layer 50c disposed between the innermost layer 50a and outermost layer 50b as with the composite package film 54 shown in FIG. 7.

The innermost layer 50a is a flexible layer, and the constituent material thereof is not restricted in particular as long as it is a synthetic resin which can exhibit the flexibility while having a chemical stability (characteristic of generating neither chemical reactions, dissolution, nor swelling) with respect to a nonaqueous electrolytic solution 30 employed, and a chemical stability with respect to oxygen and water (moisture in the air). A material further having a low permeability to oxygen, water (moisture in the air), and components of the nonaqueous electrolytic solution 30 is preferred. Examples of the material include thermoplastic resins such as polyethylene, polypropylene, acid-denatured polyethylene, acid-denatured polypropylene, polyethylene ionomer, and polypropylene ionomer.

When a layer made of a synthetic resin such as the outermost layer 50b is further provided in addition to the innermost layer 50a as in the composite package film 54 shown in FIG. 7, this synthetic resin layer may use the same constituent material as with the innermost layer 50a.

Preferably, the metal layer 50c is a layer formed from a metal material having an anti corrosion characteristic with respect to oxygen, water (moisture in the air), and the nonaqueous electrolytic solution. For example, metal foils made of aluminum, aluminum alloys, titanium, chromium, etc. may be used.

Though the method of sealing all the seal parts in the case 50 is not restricted in particular, heat sealing is preferred from the viewpoint of productivity.

Figure 8:
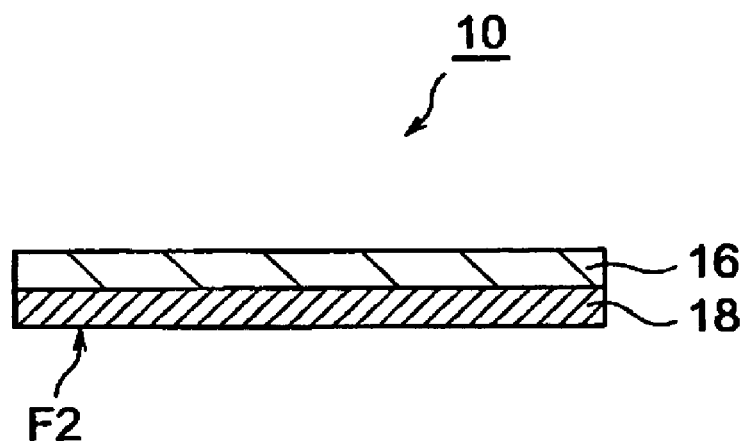
FIG. 8 is a schematic sectional view showing an example of the basic configuration of the anode in the electrochemical device shown in FIG. 1.
Figure 9:
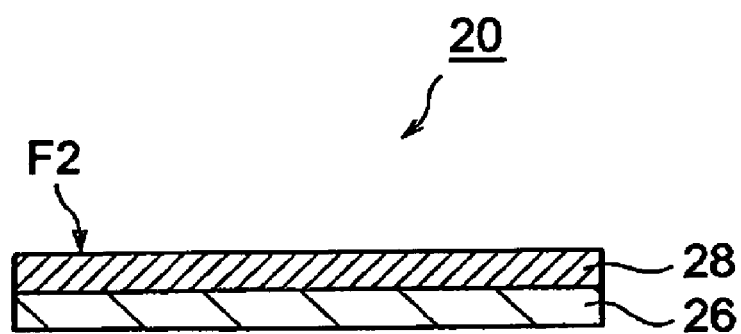
FIG. 9 is a schematic sectional view showing an example of the basic configuration of the cathode in the electrochemical device shown in FIG. 1.

The anode 10 and cathode 20 will now be explained. FIG. 8 is a schematic sectional view showing an example of the basic configuration of the anode in the lithium ion secondary battery shown in FIG. 1. FIG. 9 is a schematic sectional view showing an example of the basic configuration of the cathode in the lithium ion secondary battery shown in FIG. 1.

As shown in FIG. 8, the anode 10 is constituted by a collector 16, and an anode active material containing layer 18 formed on the collector 16. As shown in FIG. 9, the cathode 20 is constituted by a collector 26, and a cathode active material containing layer 28 formed on the collector 26.

The collectors 16 and 26 are not restricted in particular as long as they are conductors which can sufficiently move electric charges to the anode active material containing layer 18 and cathode active material containing layer 28, whereby collectors employed in known lithium ion secondary batteries can be used. Examples of the collectors 16 and 26 include metal foils made of aluminum, copper, etc.

Figure 10:
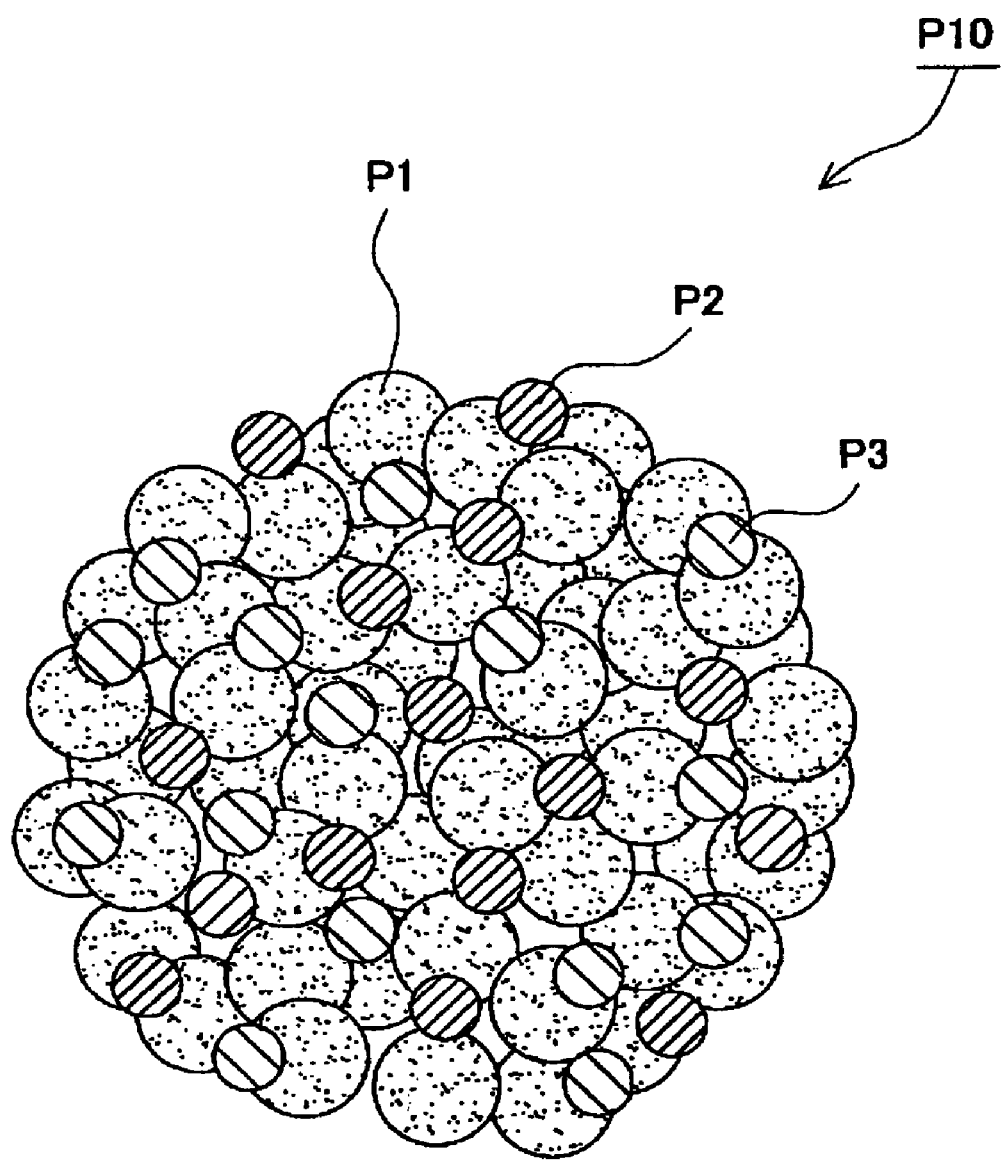
FIG. 10 is a schematic sectional view showing an example of the basic configuration of a composite particle made in a granulating step in the manufacturing method of the present invention.

The active material containing layer 18 of the anode 10 is mainly constituted by the composite particle P10 shown in FIG. 10. FIG. 10 is a schematic sectional view showing an example of the basic configuration of a composite particle made in a granulating step in the manufacturing method of the present invention. The composite particle P10 is constituted by particles P1 made of an electrode active material, particles P2 made of a conductive auxiliary agent, and particles P3 made of a binder. The average particle size of the composite particles P10 is not restricted in particular. The composite particle P10 has a structure in which the particles P1 made of the electrode active material and the particles P2 made of the conductive auxiliary agent are electrically connected to each other without being isolated. Therefore, a structure in which the particles P1 made of the electrode active material and the particles P2 made of the conductive auxiliary agent are electrically connected to each other without being isolated is also formed in the active material containing layer 18.

The electrode active material constituting the composite particle P10 contained in the anode 10 is not restricted in particular, whereby known electrode active materials can be used. Examples of the electrode active material include carbon materials such as graphite, carbon hard to become graphite, carbon easy to become graphite, and low-temperature-firing carbon which can occlude/release (intercalate or dope/undope) lithium ions; metals such as Al, Si, and Sn combinable with lithium; amorphous compounds mainly composed of oxides such as $SiO_2$ and $SnO_2$; lithium titanate ($Li_3Ti_5O_{12}$); etc.

The conductive auxiliary agent constituting the composite particle P10 contained in the anode 10 is not restricted in particular, whereby known conductive auxiliary agents can be used. Examples of the conductive auxiliary agent include carbon materials such as carbon blacks, synthetic graphite having a high crystallinity, and natural graphite; fine powders of metals such as copper, nickel, stainless steel, and iron; mixtures of the above-mentioned carbon materials and metal fine powders; and conductive oxides such as ITO.

The binder constituting the composite particle P10 contained in the anode 10 is not restricted in particular as long as it can bind particles of the electrode active material to the particles P2 made of the conductive auxiliary agent. Examples of the binder include fluorine resins such as polyvinylidene fluoride (PVDF), polytetrafluoroethylene (PTFE), tetrafluoroethylene/hexafluoropropylene copolymer (FEP), tetrafluoroethylene/perfluoroalkylvinyl ether copolymer (PFA), ethylene/tetrafluoroethylene copolymer (ETFE), polychlorotrifluoroethylene (PCTFE), ethylene/chlorotrifluoroethylene copolymer (ECTFE), and polyvinyl fluoride (PVF). This binder not only binds the particles P1 made of the above-mentioned electrode active material and the conductive auxiliary agent to each other, but also contributes to binding a foil (collector 24) and the composite particle P10 to each other.

Examples of the binder other than those mentioned above include vinylidene fluoride type fluorine rubbers such as vinylidene fluoride/hexafluoropropylene type fluoride rubber (VDF/HFP type fluorine rubber), vinylidene fluoride/hexafluoropropylene/tetrafluoroethylene type fluorine rubber (VDF/HPF/TFE type fluorine rubber), vinylidene fluoride/pentafluoropropylene type fluorine rubber (VDF/PFP type fluorine rubber), vinylidene fluoride/pentafluoropropylene/tetrafluoroethylene type fluorine rubber (VDF/PFP/TFE type fluorine rubber), vinylidene fluoride/perfluoromethylvinyl ether/tetrafluoroethylene type fluorine rubber (VDF/PFMVE/TFE type fluorine rubber), and vinylidene fluoride/chlorotrifluoroethylene type fluorine rubber (VDF/CTFE type fluorine rubber).

Other examples of the binder include polyethylene, polypropylene, polyethylene terephthalate, aromatic polyamide, cellulose, styrene/butadiene rubber, isoprene rubber, butadiene rubber, and ethylene/propylene rubber. Also, thermoplastic elastomeric polymers such as styrene/butadiene/styrene block copolymer, its hydrogenated product, styrene/ethylene/butadiene/styrene block copolymer, styrene/isoprene/styrene block copolymer, and its hydrogenated product may be used. Further, syndiotactic 1,2-polybutadiene, ethylene/vinyl acetate copolymer, propylene/α-olefin (having a carbon number of 2 to 12) copolymer, etc. may be used. Also, conductive polymers may be used.

Particles made of a conductive polymer may further be added to the composite particle P10 as its constituent. Further, when forming an electrode by a dry method using the composite particle P10, the particles may be added as a constituent of a powder containing at least the composite particle. When forming an electrode by a wet method using the composite particle P10, particles made of the conductive polymer may be added as a constituent material of a coating liquid or kneaded product containing the composite particle P10 at the time of preparing the coating liquid or kneaded product.

The conductive polymer is not restricted in particular as long as it has a lithium ion conductivity, for example. Examples of the conductive polymer include those in which monomers of polymer compounds (polyether type polymer compounds such as polyethylene oxide and polypropylene oxide, cross-linked polymers of polyether compounds, polyepichlorohydrin, polyphosphazene, polysiloxane, polyvinylpyrrolidone, polyvinylidene carbonate, polyacrylonitrile, etc.) are complexed with lithium salts such as $LiClO_4$, $LiBF_4$, $LiPF_6$, $LiAsF_6$, LiCl, LiBr, $Li(CF_3SO_2)_2N$, and $LiN(C_2F_5SO_2)_2$ or alkali metal salts mainly composed of lithium. Examples of a polymerization initiator used for complexation include photopolymerization initiators and thermal polymerization initiators suitable for the above-mentioned monomers.

When the secondary battery 1 is a metal lithium secondary battery, its anode (not depicted) may be an electrode, made of metal lithium or a lithium alloy alone, also acting as a collector. The lithium alloy is not restricted in particular, examples of which include alloys such as Li—Al, LiSi, and LiSn (LiSi being handled as an alloy here). In this case, the cathode is constituted by using the composite particle P10 having a configuration which will be explained later.

The cathode 20 of the secondary battery 1 shown in FIG. 1 is constituted by a film-like collector 34 and the film-like active material containing layer 28 disposed between the collector 34 and the electrolyte layer 40. At the time of charging, the cathode 20 is connected to a cathode of an external power supply (not depicted), and functions as an anode. The form of the cathode 20 is not restricted in particular. For example, it may be formed into a thin film as depicted. An example of the collector 34 of the cathode 20 is an aluminum foil.

The electrode active material constituting the composite particle P10 contained in the cathode 20 is not restricted in particular, whereby a known electrode active material may be used. Examples of the electrode active material include lithium cobaltate ($LiCoO_2$), lithium nickelate ($LiNiO_2$), lithium manganese spinel ($LiMn_2O_4$), mixed metal oxides represented by the general formula of $LiNi_xMn_yCo_zO_2$ (x+y+z=1), lithium vanadium compounds, $V_2O_5$, olivine type $LiMPO_4$ (where M is Co, Ni, Mn, or Fe), and lithium titanate ($Li_3Ti_5O_{12}$).

For constituents constituting the composite particle P10 contained in the cathode 20 other than the electrode active material, materials similar to those constituting the composite particle. P10 contained in the anode 10 can be used. The binder constituting the composite particle P10 contained in the cathode 20 not only binds the particles P1 made of the above-mentioned electrode active material and the particles P2 made of the conductive auxiliary agent to each other, but also contributes to binding a foil (collector 34) and the composite particle P10 to each other. As mentioned above, the composite particle P10 has a structure in which the particles P1 made of the electrode active material and the particles P2 made of the conductive auxiliary agent are electrically connected to each other without being isolated. Therefore, a structure in which the particles P2 made of the conductive auxiliary agent are electrically connected to each other without being isolated is also formed in the active material containing layer 28.

From the viewpoint of forming a contact interface among the conductive auxiliary agent, electrode active material, and electrolyte three-dimensionally with a sufficient size, it will be preferred if the particles P1 made of the electrode active material contained in the cathode 20 have a BET specific surface area of 0.1 to 1.0 $m^2/g$, more preferably 0.1 to 0.6 $m^2/g$. Also, it will be preferred if the particles P1 made of the electrode active material contained in the anode 10 have a BET specific surface area of 0.1 to 10 $m^2/g$, more preferably 0.1 to 5 $m^2/g$. In the case where the electrochemical device is a double layer capacitor, it will be preferred if each of the particles P1 contained in the cathode 20 and anode 10 has a BET specific surface area of 500 to 3,000 $m^2/g$.

From the same viewpoint, the average particle size of the particles P1 made of the electrode active material in the cathode 20 is preferably 5 to 20 μm, more preferably 5 to 15 μm. The average particle size of the particles P1 made of the electrode active material in the anode 10 is preferably 1 to 50 μm, more preferably 1 to 30 μm. From the same viewpoint, it will be preferred if the amount of the conductive auxiliary agent and binder attached to the electrode active material is 1 to 30 mass %, more preferably 3 to 15 mass % in terms of 100×(mass of conductive auxiliary agent+mass of binder)/(mass of electrode active material).

The electrolyte layer 40 may be a layer made of an electrolytic solution, a layer made of a solid electrolyte (ceramic solid electrolyte or solid polymer electrolyte), or a layer made of a separator and an electrolytic solution and/or solid electrolyte infiltrated in the separator.

The electrolytic solution 30 is prepared by dissolving a lithium-containing electrolyte into a nonaqueous solvent. The lithium-containing electrolyte may appropriately be selected from $LiClO_4$, $LiBF_4$, and $LiPF_6$, for example. Also, lithium imide salts such as $Li(CF_3SO_2)_2N$ and $Li(C_2F_5SO_2)_2N$, $LiB(C_2O_4)_2$, and the like may be used. The nonaqueous solvent can be selected from organic solvents exemplified in Japanese Patent Application Laid-Open No. SHO 63-121260, etc., such as ethers, ketones, and carbonates, for example. In particular, it will be preferred if carbonates are used in the present invention. Among the carbonates, a mixed solvent mainly composed of ethylene carbonate with at least one species of other solvents added thereto is preferably used. It will usually be preferred if the mixing ratio of ethylene carbonate/other solvents=5 to 70:95 to 30 (volume ratio). Ethylene carbonate has a high coagulation point of 36.4° C. and thus is solidified at normal temperature. Therefore, ethylene carbonate by itself cannot be used as an electrolytic solution for a battery. When at least one species of other solvents having a low coagulation point is added to ethylene carbonate, the mixed solvent yields a lower coagulation point, so as to become usable. Any solvent may be added here as long as it can lower the coagulation point of ethylene carbonate. Examples of the solvent include diethyl carbonate, dimethyl cabonate, propylene carbonate, 1,2-dimethoxyethane, methylethyl carbonate, γ-butyrolactone, γ-valerolactone, γ-octanoic lactone, 1,2-diethoxyethane, 1,2-ethoxymethoxyethane, 1,2-dibutoxyethane, 1,3-dioxolane, tetrahydrofuran, 2-methyltetrahydrofuran, 4,4-dimethyl-1,3-dioxane, butylene carbonate, and methyl formate. Using a carbonaceous material as an active material of the anode with the above-mentioned mixed solvent can remarkably improve the battery capacity and sufficiently lower the irreversible capacity ratio.

An example of the solid polymer electrolyte is a conductive polymer having an ionic conductivity.

The conductive polymer is not restricted in particular as long as it has a lithium ion conductivity. Examples of the conductive polymer include those in which monomers of polymer compounds (polyether type polymer compounds such as polyethylene oxide and polypropylene oxide, crosslinked polymers of polyether compounds, polyepichlorohydrin, polyphosphazene, polysiloxane, polyvinylpyrrolidone, polyvinylidene carbonate, polyacrylonitrile, etc.) are complexed with lithium salts such as $LiClO_4$, $LiBF_4$, $LiPF_6$, $LiAsF_6$, LiCl, LiBr, $Li(CF_3SO_2)_2N$, and $LiN(C_2FsSO_2)_2$ or alkali metal salts mainly composed of lithium. Examples of a polymerization initiator used for complexation include photopolymerization initiators and thermal polymerization initiators suitable for the above-mentioned monomers.

Examples of support salts constituting the polymer solid electrolyte include salts such as $LiClO_4$, $LiPF_6$, $LiBF_4$, $LiAsF_6$, $LiCF_3SO_3$, $LiCF_3CF_2SO_3$, $LiC(CF_3SO_2)_3$, $LiN(CF_3SO_2)_2$, $LiN(CF_3CF_2SO_2)_2$, $LiN(CF_3SO_2)(C_4F_9SO_2)$, and $LiN(CF_3CF_2CO_2)_2$, and their mixtures.

When a separator is used in the electrolyte layer 40, examples of its constituent material include at least one species (a laminate of two or more layers of films or the like in the case of two or more species) of polyolefins such as polyethylene and polypropylene, polyesters such as polyethylene terephthalate, thermoplastic fluorine resins such as ethylene/tetrafluoroethylene copolymer, and celluloses. Examples of the form of the sheet include microporous films, woven fabrics, and nonwoven fabrics having an air permeability of about 5 to 2,000 sec/100 cc measured by the method defined in JIS-P8117 and a thickness of about 5 to 100 μm. A monomer of a solid electrolyte may be infiltrated into the separator and then cured so as to be polymerized for use.

The electrochemical device (lithium ion secondary battery) explained in the foregoing can be made in conformity to the method of making a composite particle for an electrode, method of making an electrode, and method of making an electrochemical device in accordance with the present invention. Also, the electrochemical device (lithium ion secondary battery) explained in the foregoing can be made by the apparatus for making a composite particle for an electrode, apparatus for making an electrode, and apparatus for making an electrochemical device in accordance with the present invention having respective mechanisms operating according to the manufacturing methods mentioned above.

A preferred embodiment of each of the manufacturing methods and manufacturing apparatus in accordance with the present invention will now be explained.

Figure 11:
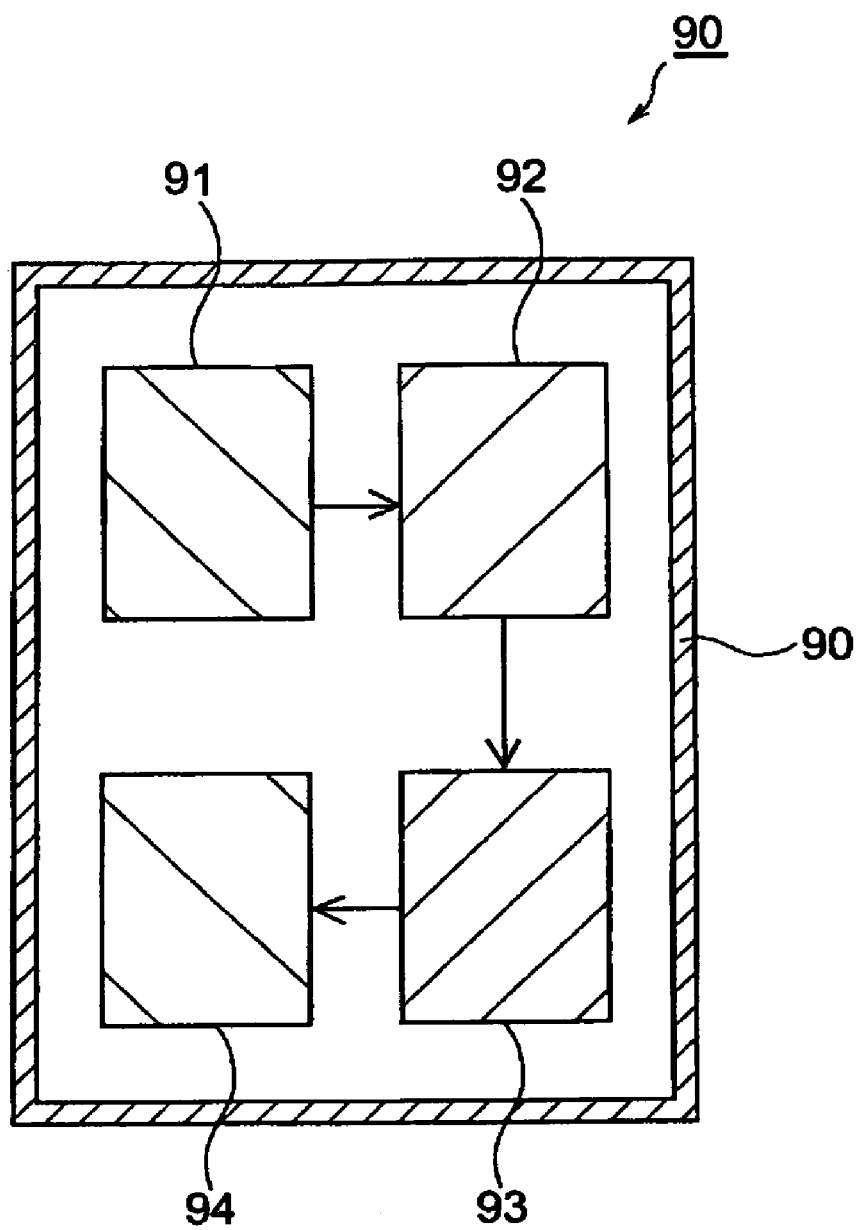
FIG. 11 is an explanatory view showing a basic configuration of a preferred embodiment of the apparatus for making an electrochemical device in accordance with the present invention.

FIG. 11 is an explanatory view showing the basic configuration of a preferred embodiment of the apparatus for making an electrochemical device in accordance with the present invention. The apparatus 90 shown in FIG. 11 is mainly constituted by a plasma processing part 91, a granulating part 92, an active material containing layer forming part 93, a device assembling part 94, and an inert gas atmosphere forming means 95. The apparatus 90 has a mechanism operating according to the manufacturing methods of the present invention.

In the following, configurations of the plasma processing part 91, granulating part 92, active material containing layer forming part 93, device assembling part 94, and inert gas atmosphere forming means 95 will be explained in detail together with the individual operating methods, so as to explain preferred embodiments of the manufacturing methods of the present invention in detail.

The inert gas atmosphere forming means 95 has a mechanism for carrying out all the manufacturing steps after plasma processing in the plasma processing part 91, which will be explained later, in an inert gas atmosphere. A preferred example of the inert gas atmosphere forming means 95 is a glove box. In the apparatus 90, the inert gas atmosphere forming means 95 such as glove box allows manufacturing operations in all the manufacturing steps after the plasma processing to proceed in an inert gas atmosphere. For example, the manufacturing operations are carried out while the inside of the inert gas atmosphere forming means 95 such as glove box is filled with an inert gas, the oxygen concentration is adjusted to 1 ppm or lower, and the relative humidity is adjusted to 0.04% (dew point of about −60° C.) or lower.

In the plasma processing part 91, plasma processing is carried out such that a material made of a carbonaceous material is subjected to high-frequency thermal plasma processing in a plasma gas atmosphere, so as to yield particles made of an electrode active material having an electronic conductivity.

Figure 12:
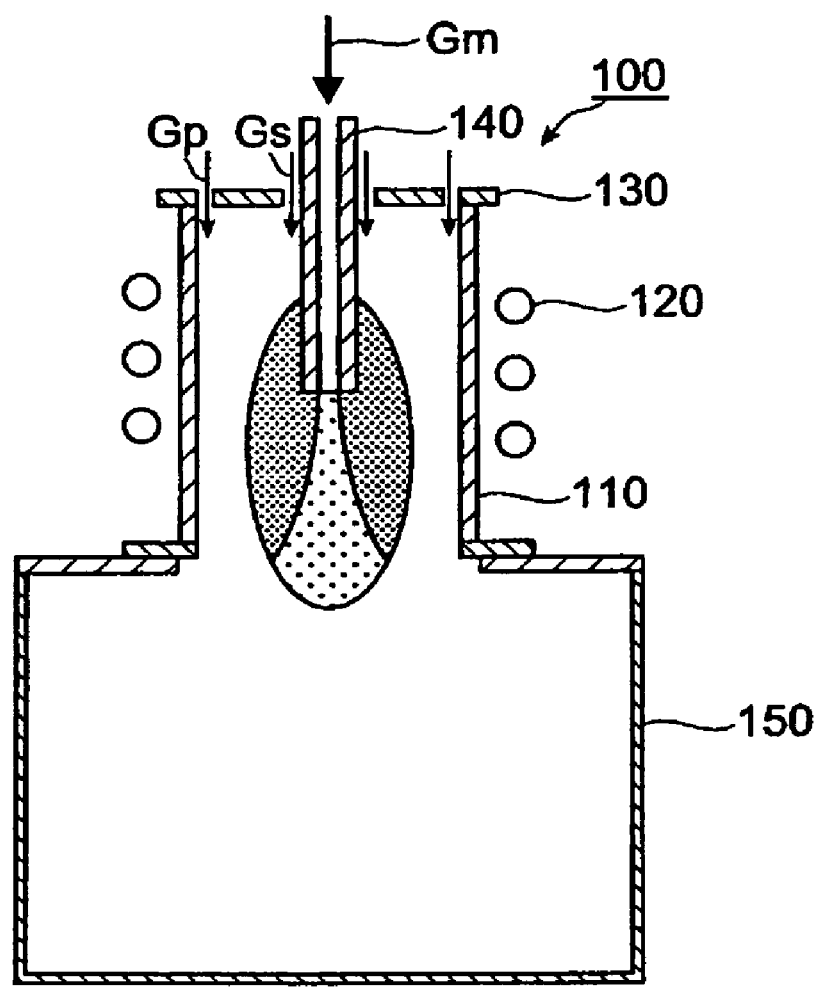
FIG. 12 is a schematic diagram of a high-frequency thermal plasma generator (plasma torch) employed for carrying out plasma processing.

A high-frequency thermal plasma generator (plasma torch) is disposed in the plasma processing part 91. FIG. 12 is a schematic diagram of the high-frequency thermal plasma generator (plasma torch) used for carrying out plasma processing.

First, particles of the material (hereinafter referred to as "material particles P50") made of the carbonaceous material to become a constituent material in the composite particle P10 contained in the active material containing layer 18 of the anode 10 or the active material containing layer 28 of the cathode 20 are obtained. Specifically, the material particles are subjected to the high-frequency thermal plasma processing in a plasma gas atmosphere.

The material made of the carbonaceous material is not restricted in particular as long as it becomes a carbon material having an electronic conductivity when subjected to the high-frequency thermal plasma processing. Examples of the material include graphite, pitch type materials, coconut shells, and phenol resin.

Examples of the material made of the carbonaceous material to become the electrode active material upon the high-frequency thermal plasma processing include various resins such as phenol resin, acrylic resins, furan resins, linear vinyl type polymers like polyvinylidene chloride (PVDC) and polyacrylonitrile, and polymers comprising biphenyl bonds such as polyphenylene. Nitrogen-containing resins, e.g., polyamides such as polyaniline, polyimide, and nylon, and nitrogen-containing phenol resin, are usable as well. Various saccharides such as polysaccharides can also be used. Among them, phenol resin, truly spherical phenol resin in particular, is preferred.

Examples of the material made of the carbonaceous material other than those mentioned above include graphite, glassy carbon, pyrolytic graphite, carbon fiber, carbon paste, and activated carbon. In particular, activated carbon is preferred. Activated carbon is not restricted in particular, but is preferably mainly composed of one obtained by activating coking coal [e.g., petroleum coke made by a delayed coker using bottom oils of fluidized catalytic crackers of petroleum heavy oils or residual oils of vacuum distillators as a material oil, carbonized resins (phenol resin, etc.), and carbonized natural materials (e.g., coconut shell carbon)].

Among them, MCMB (mesophase carbon microbeads) are preferred in particular. The MCMB are made by graphitizing truly spherical carbonaceous materials obtained from pitch, and can be handled more easily than conventional graphite materials when making electrode materials. Namely, the MCMB are excellent in fluidity, so that they are suitably subjected to the high-frequency thermal plasma processing and can be processed by a large amount, thus tending to yield an excellent productivity. Also, they tend to facilitate the forming of a film when making an electrode.

The material subjected to the high-frequency plasma processing and the carbonaceous material after the high-frequency plasma processing are preferably in particle or powder form, whereas their average particle size is preferably 0.5 to 100 μm. These particles are preferably spherical, but may be in other forms such as ellipsoidal or amorphous forms.

The high-frequency plasma processing can be carried out according to Takamasa Ishigaki, *Ceramics*, 30 (1995), No. 11, 1013-1016, and Japanese Patent Application Laid-Open Nos. HEI 7-31873, HEI 10-92432, and 2000-223121, for example.

The high-frequency thermal plasma generator (thermal plasma torch) 100 shown in FIG. 12 is one in which an object is continuously introduced into a plasma torch and collected in the lower part. The high-frequency thermal plasma generator 100 has a configuration in which a high-frequency coil 12 is wound about the outer periphery of a water-cooled double pipe 110. Here, high-frequency electromagnetic induction is effected, so as to form thermal plasmas within the water-cooled double pipe 110. A lid 130 is attached to an opening located at the upper part of the water-cooled double pipe 11, and is provided with a powder supplying water-cooled probe 140 for supplying powders of the material to be subjected to the high-frequency thermal plasma processing and a carrier gas. A central gas (Gp) mainly used for forming a plasma flow and a sheath gas (Gs) mainly used for enveloping the outside of the plasma flow are introduced into the apparatus 100. In FIG. 12, arrow Gm indicates the supplying direction of the material powders and carrier gas, whereas arrows Gp and Gs indicate respective introducing directions of the central gas and sheath gas.

In the present invention, the central gas, sheath gas, and carrier gas are collectively referred to as "plasma gas". The high-frequency plasma processing is carried out in this plasma gas atmosphere.

The plasma gas preferably uses at least Ar, more preferably at least one species of $N_2$, $H_2$, $CO_2$, and Co with Ar. In particular, it will be preferred if $N_2$ or $H_2$ is used together with Ar, or $CO_2$ is further added to them. Preferably, the content of gases other than Ar in the plasma gas is 1 to 20 vol % of the total amount of the plasma gas. Species of gases used in the central gas, sheath gas, and carrier gas are not restricted in particular, but each preferably contains at least Ar. In particular, it will be preferred if a diatomic gas such as $N_2$ or $H_2$ is mixed into the sheath gas in order to protect the inner wall of the torch. When the plasma gas uses at least $H_2$, it tends to reduce the irreversible capacity, thereby being able to improve the initial charging/discharging efficiency more sufficiently. The total flow rate of the central gas and sheath gas is usually 2 to 200 L/min, preferably 30 to 130 L/min.

The amount of the material introduced is preferably 1 to 500 g/min, whereas the flow rate of the carrier gas is preferably 1 to 100 L/min.

When the plasma gas is appropriately selected, the effect caused by the high-frequency thermal plasma processing can be controlled. For example, since $H_2$ has a thermal conductivity higher than that of $N_2$, the heating efficiency tends to become higher when $H_2$ is used.

The high-frequency thermal plasma generating condition is usually with a frequency of 0.5 to 6 MHz, preferably 3 to 6 MHz, an input power of 3 to 60 kW, and a pressure within the torch of 1 to 100 kPa, preferably 10 to 70 kPa.

Using such a generator 100 enables high-frequency thermal plasma processing at a temperature of 3,000° to 15,000° C. In the present invention, it will be preferred if the material retention time in the temperature region of 3,000° to 15,000° C. is about 0.001 to 10 seconds, 0.02 to 0.5 second in particular.

Though the size of the high-frequency thermal plasma generator 100 (plasma torch) is not restricted in particular, the tube diameter is preferably 10 to 1,000 mm, more preferably 50 to 100 mm, and the height is preferably 50 to 3,000 mm, more preferably 200 to 3,000 mm in the structure shown in FIG. 12.

The material may be subjected to the high-frequency thermal plasma processing either by itself or in a mixture with an oxide. Preferred examples of the oxide used in this case include lithium cobaltate ($LiCoO_2$), lithium nickelate ($LiNiO_2$), lithium manganate ($LiMnO_2$), lithium manganese spinel ($LiMn_2O_4$), lithium vanadium compounds, $V_2O_5$, and olivine type $LiMPO_4$ (where M is Co, Ni, Mn, or Fe). Preferably, the amount of the oxide is not greater than 10 mass % on the basis of the total amount of the mixture (material+oxide).

The granulating part 92 will now be explained. The granulating part 92 carries out a granulating process of integrating a conductive auxiliary agent and a binder adapted to bind the conductive auxiliary agent and an electrode active material together with the particles P1 made of the electrode active material obtained after the plasma processing while in close contact with each other in an inert gas atmosphere so as to form the composite particle P10 for an electrode containing the electrode active material, conductive auxiliary agent, and binder.

As such, the composite particle P10 is formed by way of the granulating step of integrating the conductive auxiliary agent and binder with the particles P1 made of the electrode active material while in close contact with each other in the granulating part 92, thereby forming the composite particle containing the electrode active material, conductive auxiliary agent, and binder.

The granulating step includes a material liquid preparing step of preparing a material liquid containing the binder, the conductive auxiliary agent, and a solvent; a fluidizing step of generating a gas flow in a fluidizing tank, putting a particle made of the electrode active material into the fluidizing tank, and causing the particle made of the electrode active material to form a fluidized layer; and a spraying/drying step of spraying the material liquid into the fluidized layer containing the particle made of the electrode active material so that the material liquid is attached to the particle made of the electrode active material and is dried, so as to remove the solvent from the material liquid attached to a surface of the particle made of the electrode active material, and cause the binder to bring the particle made of the electrode active material and a particle made of the conductive auxiliary agent into close contact with each other. The granulating part 92 is equipped with a mechanism for carrying out the material liquid preparing step, fluidizing step, and spraying/drying step.

Figure 13:
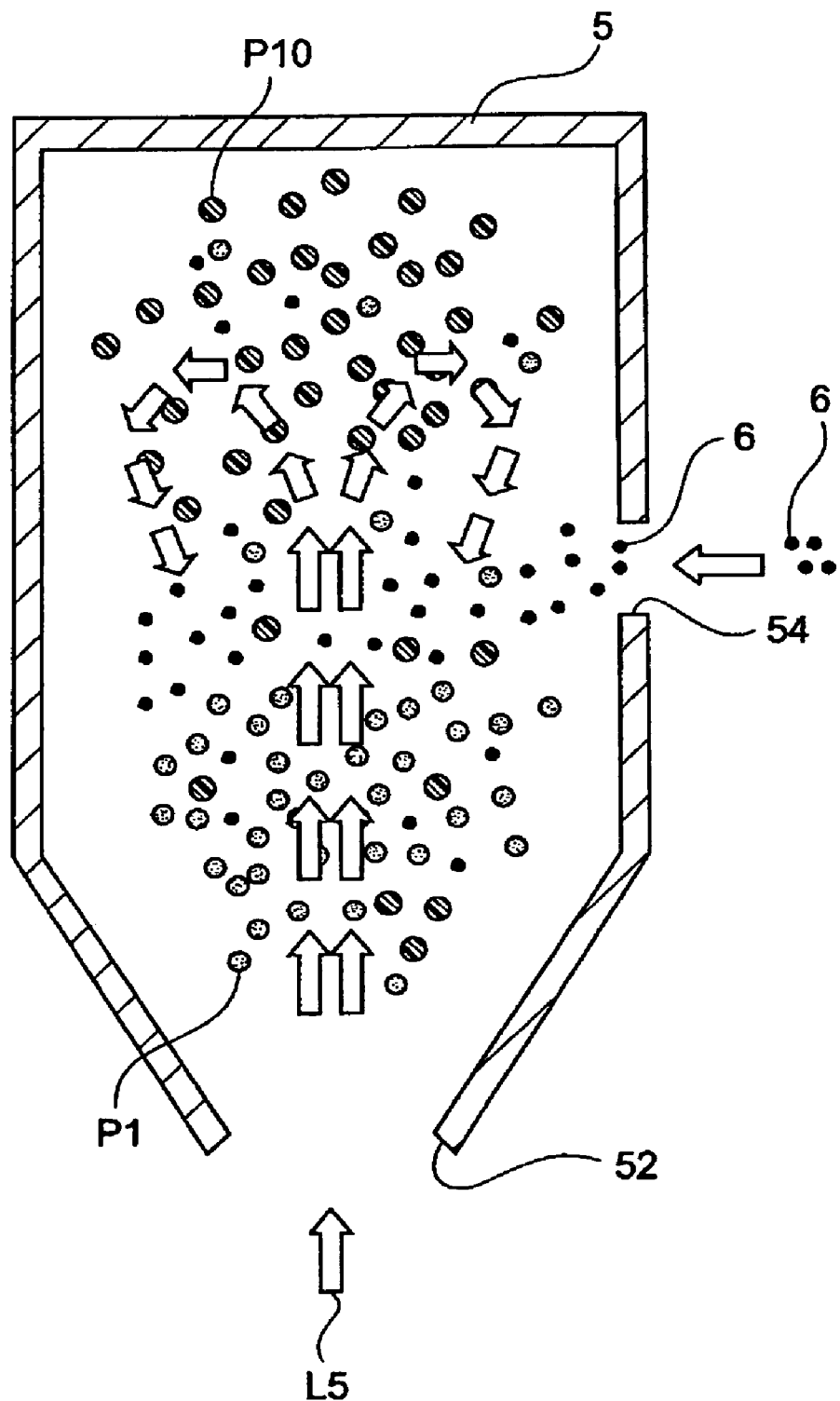
FIG. 13 is an explanatory view showing an example of the granulating step when making an electrode.
Figure 14:
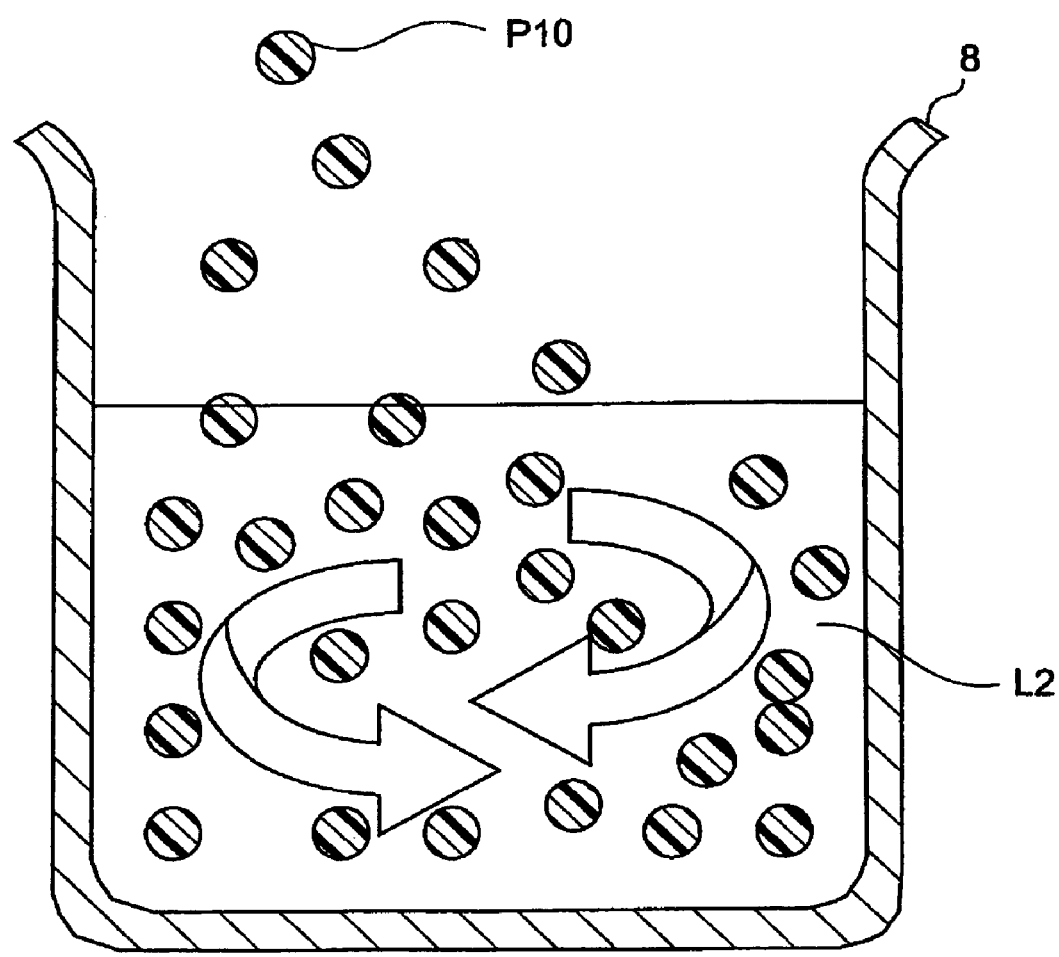
FIG. 14 is an explanatory view showing an example of the coating liquid preparing step when making an electrode by a wet method.

The granulating step carried out in the granulating part 92 will be explained specifically with reference to FIG. 13. FIG. 13 is an explanatory view showing an example of the granulating step when making the composite particle.

First, in the material liquid preparing step, a solvent adapted to dissolve the binder is used, and the binder is dissolved in this solvent. Subsequently, the conductive auxiliary agent is dispersed in thus obtained solvent, so as to yield a material liquid. In the material liquid preparing step, the solvent may be one (dispersant) adapted to disperse the binder.

Next, in the fluidizing step, a gas flow is generated by a predetermined gas flow generating means (not depicted) in a fluidizing tank 5 as shown in FIG. 13, and particles P1 made of the electrode active material are put into the gas flow, so that the particles made of the electrode active material form a fluidized layer.

Subsequently, in the spraying/drying step, a predetermined spraying means (not depicted) sprays droplets 6 of the material liquid as shown in FIG. 13, so that the droplets 6 of the material liquid adhere to the fluidized layer of the particles P1 made of the electrode active material and are dried in the fluidizing tank 5 at the same time, so as to remove the solvent from the droplets 6 of the material liquid attached to surfaces of the particles P1 made of electrode active material, thereby causing the binder to bring the particles P1 made of the electrode active material and the particles P2 made of the conductive auxiliary agent into close contact with each other, thus yielding the composite particle P10.

More specifically, the fluidizing tank 5 is a container having a tubular form, for example, and has a bottom part provided with an opening 52 for introducing a flow of warm air (or hot air) L5 from the outside and causing convection of the particles made of the electrode active material within the fluidizing tank 5. The side face of the fluidizing tank 5 is provided with an opening 54 for introducing the droplets 6 of the material liquid to be sprayed to the particles P1 made of the electrode active material convected within the fluidizing tank 5. The droplets 6 of the material liquid containing the binder, conductive auxiliary agent, and solvent are sprayed to the particles P1 made of the electrode active material convected within the fluidizing tank 5.

Here, the temperature of the atmosphere in which the particles P1 made of the electrode active material are placed is held at a predetermined temperature [preferably a temperature from 50° C. to a temperature not greatly exceeding the melting point of the binder, more preferably a temperature from 50° C. to a temperature not higher than the melting point of the binder (e.g., 200° C.)] by regulating the temperature of the warm air (or hot air), for example, so as to dry the liquid film of the material liquid formed on the surfaces of the particles P1 made of the electrode active material substantially simultaneously with the spraying of the droplets 6 of the material liquid. This brings the binder and the conductive auxiliary agent into close contact with the surfaces of the particles made of the electrode active material, thereby yielding the composite particle P10.

The solvent adapted to dissolve the binder is not restricted in particular as long as it can dissolve the binder and disperse the conductive auxiliary agent. For example, N-methyl-2-pyrrolidone and N,N-dimethylformamide can be used.

The active material containing layer forming part 93 will now be explained. By using the composite particle P10, the active material containing layer forming part forms an active material containing layer at a location where the active material containing layer is to be formed in a collector. More specifically, the active material containing layer is formed according to the wet or dry method explained in the following. The active material containing layer forming part 93 is equipped with a mechanism for forming the active material containing layer according to the wet or dry method explained in the following.

Wet Method

First, a preferred example of a case where an electrode forming coating liquid is prepared by using the composite particle P10 made by way of the above-mentioned granulating step, and then is used for forming an electrode will be explained. Initially, an example of the method of preparing the electrode forming coating liquid will be explained.

For example, the electrode forming coating liquid can be formed by preparing a liquid mixture in which the composite particle P10 made by way of the granulating step, a liquid adapted to disperse or dissolve the composite particle P10, and a conductive polymer added when necessary are mixed together, and then removing a part of the liquid from the liquid mixture, so as to make it attain a viscosity suitable for coating.

More specifically, when using a conductive polymer, a liquid mixture in which a liquid adapted to disperse or dissolve the composite particle P10 and a conductive polymer or monomers to become a constituent material of the conductive polymer are mixed together is prepared in a container 8 having a predetermined stirring means (not depicted) such as stirrer, for example. Subsequently, the composite particle P10 is added to the liquid mixture, and they are fully stirred, whereby an electrode forming coating liquid L2 can be prepared.

Next, using the electrode forming coating liquid L2, an active material containing layer is formed.

First, the electrode forming coating liquid L2 is applied to a surface of the collector, so as to form a liquid film of the coating liquid on the surface. Then, the liquid film is dried, so as to form the active material containing layer on the collector, thereby completing the making of the electrode. Here, the technique for applying the electrode forming coating liquid to the surface of the collector is not restricted in particular, and may be determined appropriately in conformity to the material, form, etc. of the collector. Examples of the technique include metal mask printing, electrostatic coating, dip coating, spray coating, roll coating, doctor blading, gravure coating, and screen printing.

The technique for forming the active material containing layer from the liquid film of the electrode forming coating liquid L2 may be accompanied with not only drying but also a curing reaction between constituents in the liquid film (e.g., a polymerization reaction of monomers to become a constituent material of the conductive polymer) at the time of forming the active material containing layer from the liquid film of the coating liquid L2. When using the electrode forming coating liquid L2 containing monomers to become a constituent material of a UV-curable resin (conductive polymer), the electrode forming coating liquid L2 is initially applied onto the collector by the above-mentioned predetermined method. Then, the liquid film of the coating liquid is irradiated with UV rays, so as to form the active material containing layer.

In this case, after the liquid film of the electrode forming coating liquid is formed on the collector, monomers are polymerized in the liquid film, so as to generate a conductive polymer, whereby the conductive polymer can be generated in gaps between the composite particles P10 while substantially keeping a favorable state of dispersion of the composite particles P10 in the liquid film. Therefore, the state of dispersion of the composite particles P10 and conductive polymer in the resulting active material containing layer can be made better than that in the case where the conductive polymer (particle made of the conductive polymer) is contained in the electrode forming coating liquid L2 beforehand.

Namely, ion conduction networks and electron conduction networks in which finer, denser particles (particles made of the composite particles P10 and conductive polymer) are integrated can be constructed. Therefore, in this case, a polymer electrode having such an excellent polarization characteristic that electrode reactions can sufficiently proceed even in a relatively low operation temperature region can be obtained more easily and more reliably.

In this case, the polymerization reaction of monomers to become a constituent material of the UV-curable resin can be progressed upon irradiation with UV rays.

When necessary, the resulting active material containing layer may further be subjected to extending so as to be heat-treated and formed into a sheet by using a hot plate press or hot rolls.

Though the foregoing explanation exemplifies a case where the electrode forming coating liquid 7 containing the composite particle P10 is prepared and used for forming an electrode, the method (wet method) of forming an electrode using the composite particle P10 is not restricted thereto.

Figure 16:
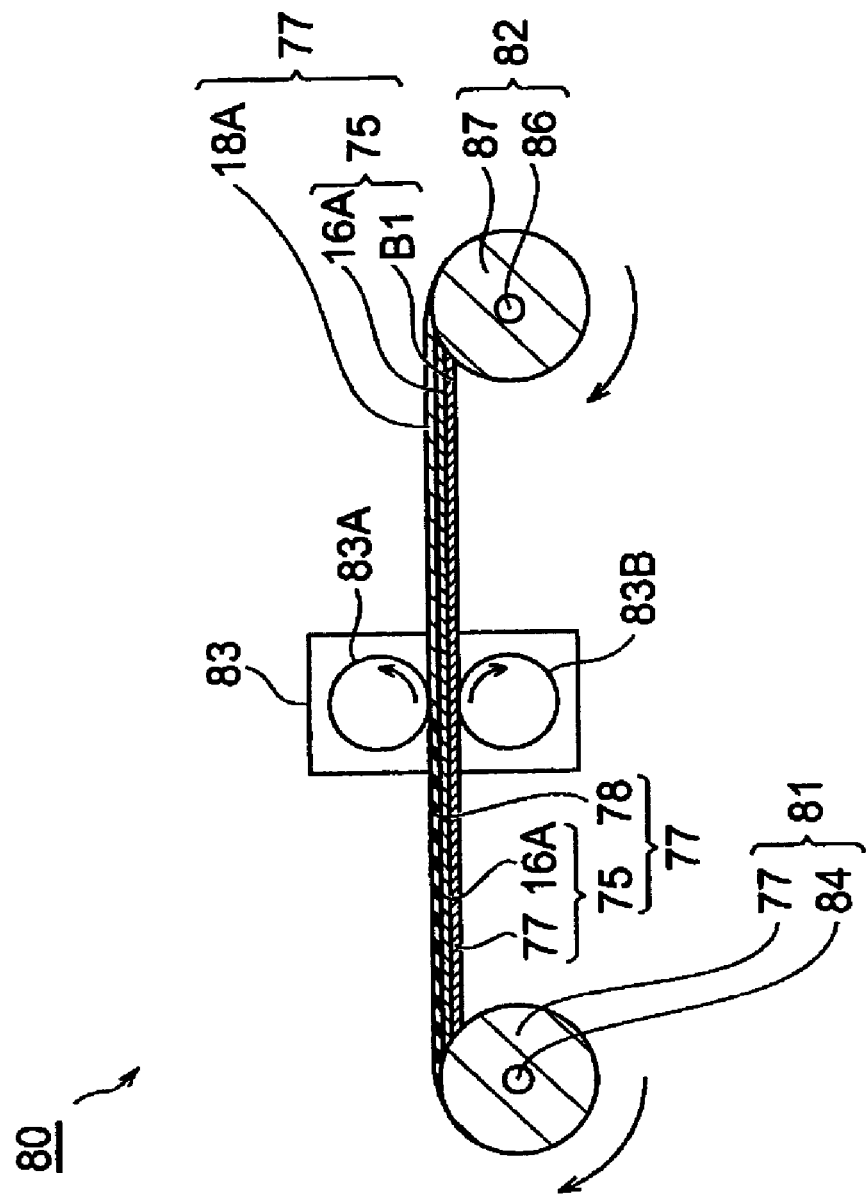
FIG. 16 is an explanatory view for explaining a step of forming the electrode sheet using the electrode forming coating liquid.
Figure 17:
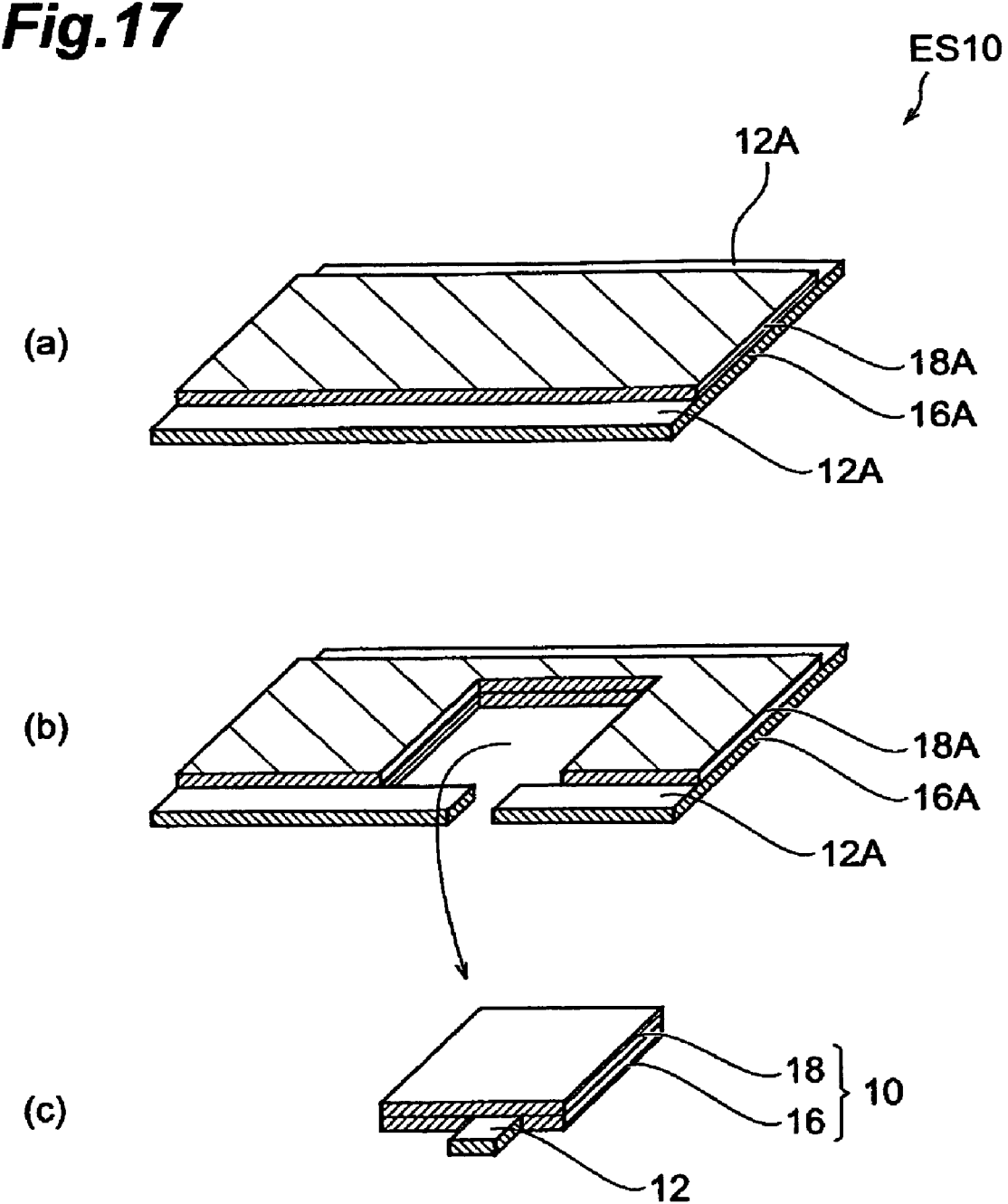
FIG. 17 is an explanatory view for explaining steps of forming an electrode from the electrode sheet.

A more specific mode of the wet method in which an electrode sheet ES10 shown in FIG. 17 is formed by using the electrode forming coating liquid L2 and apparatus 70 and 80 shown in FIGS. 15 and 16 will now be explained. The following will explain methods of forming the electrode sheet ES10 for the anode 10 (see FIG. 17) and the anode 10 obtained from the electrode sheet ES10, while omitting the method of forming the cathode 20 having the same configuration as with the anode 10.

Figure 15:
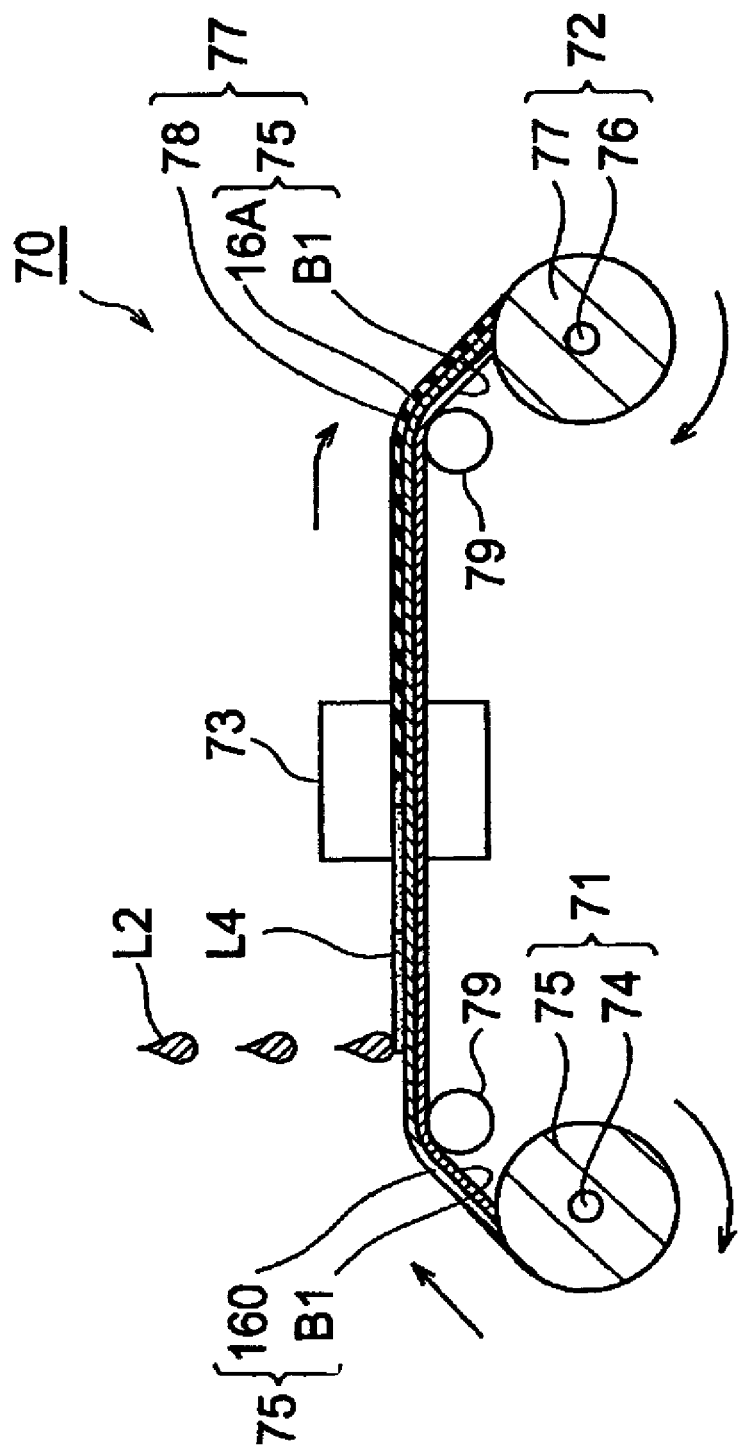
FIG. 15 is an explanatory view for explaining a step of forming an electrode sheet using an electrode forming coating liquid.

The apparatus 70 shown in FIG. 15 is mainly constituted by a first roll 71, a second roll 72, a dryer 73 disposed between the first roll 71 and second roll 72, and two support rolls 79. The first roll 71 is constituted by a columnar core 74 and a tape-like laminate sheet 75. With one end connected to the core 74, the laminate sheet 75 is wound about the core 74. The laminate sheet 75 is configured such that a metal foil sheet 16A is laminated on a support sheet B1.

The second roll 72 has a columnar core 76 to which the other end of the laminate sheet 75 is connected. Further connected to the core 76 of the second roll 72 is a core driving motor (not depicted) for rotating the core 76, whereby the laminate sheet 77 obtained after being coated with the electrode forming coating liquid L1 and then being dried in the dryer 73 is rotated at a predetermined speed.

First, when the core driving motor revolves, the core 76 of the second roll 72 is rotated, whereby the laminate sheet 75 wound about the core 74 of the first roll 71 is drawn out of the first roll 71. Subsequently, the electrode forming coating liquid L2 is applied onto the metal foil sheet 16A of thus drawn laminate sheet 75 (coating step). This forms a coating film L4 made of the electrode forming coating liquid L2 on the metal foil sheet 16A.

Next, as the core driving motor revolves, the part of laminate sheet 75 formed with the coating film L4 is guided into the dryer 73 by the support rolls 79. In the dryer 73, the coating film L4 on the laminate sheet 75 is dried, so as to become a layer 78 (hereinafter referred to as "precursor layer 78") which is a precursor of the porous layer 18 in the electrode (liquid removing step). As the core driving motor revolves, the laminate sheet 77 having the precursor layer 78 formed on the laminate sheet 75 is guided to the core 76 by the support rolls 79.

Next, using the laminate sheet 77 and the apparatus 80 shown in FIG. 16, the electrode sheet ES10 is produced.

The apparatus 80 shown in FIG. 16 is mainly constituted by a first roll 81, a second roll 82, and a roll press 83 disposed between the first roll 81 and second roll 82. The first roll 81 is constituted by a columnar core 84 and the above-mentioned tape-like laminate sheet 77. With one end connected to the core 84, the laminate sheet 77 is wound about the core 84. The laminate sheet 77 is configured such that the precursor layer 78 is further laminated on the laminate sheet 75 in which the metal foil sheet 16A is laminated on the support sheet B1.

The second roll 82 has a columnar core 86 to which the other end of the laminate sheet 77 is connected. Further connected to the core 86 of the second roll 82 is a core driving motor (not depicted) for driving the core 86, whereby the laminate sheet 87 after being pressed in the roll press 83 is wound at a predetermined speed.

First, as the core driving motor revolves, the core 86 of the second roll 82 is rotated, whereby the laminate sheet 77 wound about the core 84 of the first roll 81 is drawn out of the first roll 81. Subsequently, as the core driving motor revolves, the laminate sheet 77 is guided into the roll press 83. Two columnar rollers 83A and 83B are disposed in the roll press 83. The rollers 83A and 83B are arranged such that the laminate sheet 77 is inserted therebetween. When the laminate sheet 77 is inserted between the rollers 83A and 83B, the side face of the roller 83A and the outer surface of the precursor layer 78 of the laminate 77 come into contact with each other, the side face of the roller 83B and the outer surface (rear face) of the support sheet B1 in the laminate sheet 77 come into contact with each other, and the laminate sheet 77 can be pressed at a predetermined temperature and pressure.

Each of the columnar rollers 83A and 83B is equipped with a rotary mechanism rotating in a direction conforming to the moving direction of the laminate sheet 77. The columnar rollers 83A and 83B have such sizes that the distance between their bottom faces is not shorter than the width of the laminate sheet 77.

In the roll press 83, the precursor layer 78 on the laminate sheet 77 is heated and pressed as necessary, so as to become a porous layer 18A (porous layer 18 in the case of an anode). As the core driving motor revolves, the laminate sheet 87 in which the porous layer 18A is formed on the laminate sheet 77 is wound about the core 86.

Next, as shown in FIG. 17(a), the laminate sheet 87 wound about the core 86 is cut into a predetermined size, so as to yield the electrode sheet ES10. The electrode sheet ES10 shown in FIG. 17(a) is formed with edge parts 12A where the surface of the metal foil sheet 16A is exposed. The edge parts 12A can be formed by controlling such that the electrode forming coating liquid L2 is applied only to the center part of the metal foil sheet 16A on the laminate sheet 75 when applying the electrode forming coating liquid L2 onto the metal foil sheet 16A.

Subsequently, the electrode sheet ES10 is punched out in conformity to the scale of the electrochemical device to be produced, so as to yield the anode 10 shown in FIG. 17(c). When the electrode sheet ES10 is punched out such that a portion of the edge part 12A is included as an anode lead 12, the anode 10 integrated with the anode lead 12 beforehand can be obtained. When neither anode lead conductor 12 nor cathode lead 22 has been connected, the anode lead conductor 12 and cathode lead 22 are prepared separately, and are electrically connected to the anode 10 and cathode 20, respectively.

Dry Method

A case where an electrode is formed by a dry method using the composite particle P10 made by way of the above-mentioned granulating step without using a solvent will now be explained.

In this case, the active material containing layer is formed by way of the following active material containing layer forming step. The active material containing layer forming step comprises a sheet forming step of subjecting a powder P12 containing at least the composite particle P10 to heating and pressing so as to yield a sheet 180 containing at least the composite particle; and an active material containing layer arranging step of arranging the sheet 180 as the active material containing layer (active material containing layer 18 or 28) on the collector.

The dry method is a method of forming an electrode without using a solvent, and is advantageous in that 1) it is safe, since no solvent is necessary; 2) the electrode (porous layer) can easily attain a higher density, since only particles are extended without using a solvent; 3) since no solvent is used, unlike the wet method, the particles P1 made of the electrode active material, the particles P2 made of the electrode forming coating liquid for imparting a conductivity, and the particles P3 made of the binder are prevented from being coagulated and unevenly distributed in the process of drying the electrode forming coating liquid applied onto the collector; etc.

Figure 18:
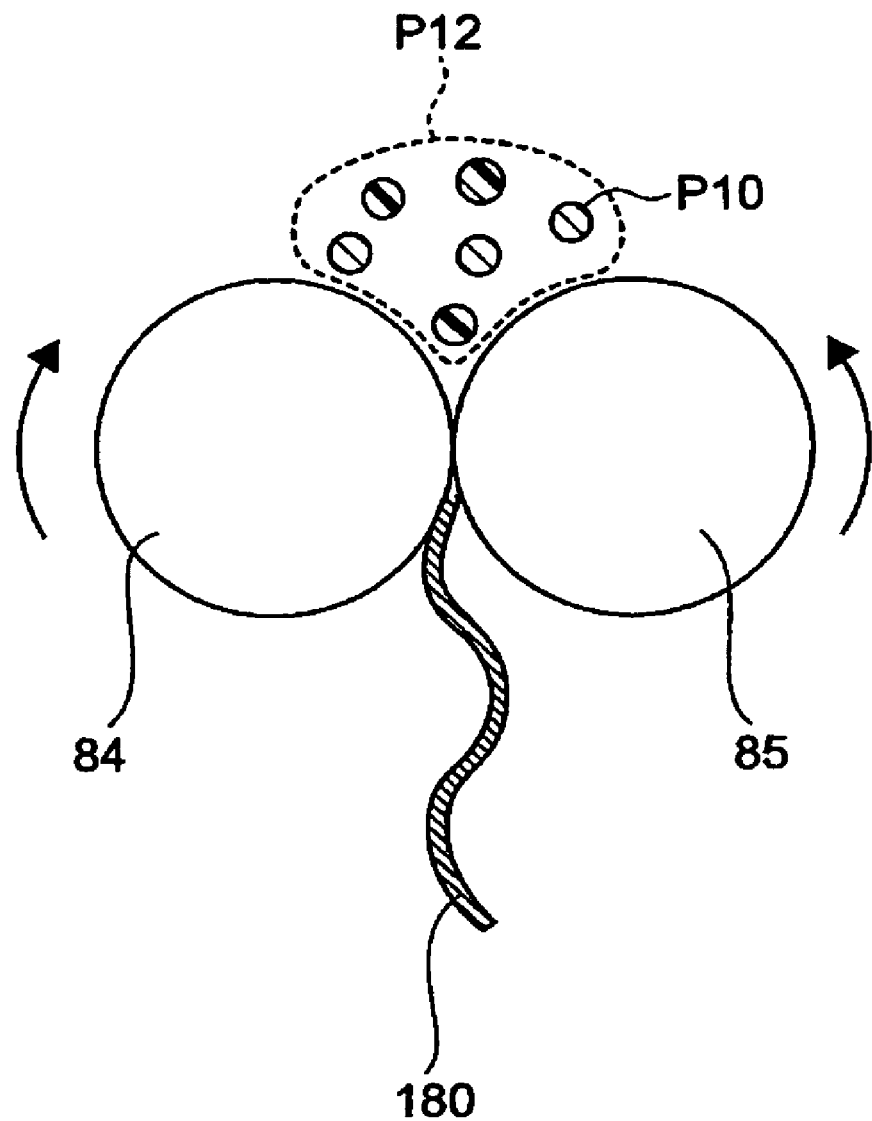
FIG. 18 is an explanatory view showing an example of the sheet forming step when making an electrode by a dry method.

This sheet forming step can favorably be carried out by using the thermal roll press shown in FIG. 18.

FIG. 18 is an explanatory view showing an example of the sheet forming step (using a thermal roll press) when making an electrode by the dry method.

In this case, as shown in FIG. 18, the powder P12 containing at least the composite particle P10 is fed between a pair of thermal rolls 84 and 85 in the thermal roll press, so as to be mixed and kneaded, and extended under a heat and pressure, thus being formed into the sheet 180 (active material containing layer). Here, the surface temperature of the thermal rolls 84 and 85 is preferably 60° to 120° C., and the pressure is preferably 20 to 5,000 kgf/cm.

Here, at least one species of the particle P1 made of the electrode active material, the particle P2 made of the conductive auxiliary agent for imparting a conductivity, and the particle P3 made of the binder may further be mixed with the powder P12 containing at least the composite particle P10.

Before being fed into the thermal roll press shown in FIG. 18, the powder P12 containing at least the composite particle P10 may be kneaded by mixing means such as a mill.

Next, the sheet 180 (active material containing layer) and the collector are brought into electric contact with each other, so as to produce the electrode sheet ES10 similar to the one shown in FIG. 17(a). The collector and the sheet 180 (active material containing layer) may be brought into electric contact with each other after the sheet 180 (active material containing layer) is formed by the thermal roll press, or simultaneously with the forming of a sheet of the active material containing layer by supplying the collector and the constituent (powder P12 containing at least the composite particle P10) of the active material containing layer sprayed on one face of the collector to the hot rolls 84 and 85.

Then, as in the method shown in FIGS. 17(a), 17(b), and 17(c), the electrode sheet ES10 is punched out in conformity to the scale of the electrochemical device to be produced, so as to yield the anode 10 (and cathode 20). When the electrode sheet ES10 is punched out such that a portion of the edge part 12A is included as an anode lead 12, the anode 10 integrated with the anode lead 12 beforehand can be obtained. When neither anode lead conductor 12 nor cathode lead 22 has been connected, the anode lead conductor 12 and cathode lead 22 are prepared separately, and are electrically connected to the anode 10 and cathode 20, respectively.

Figure 19:
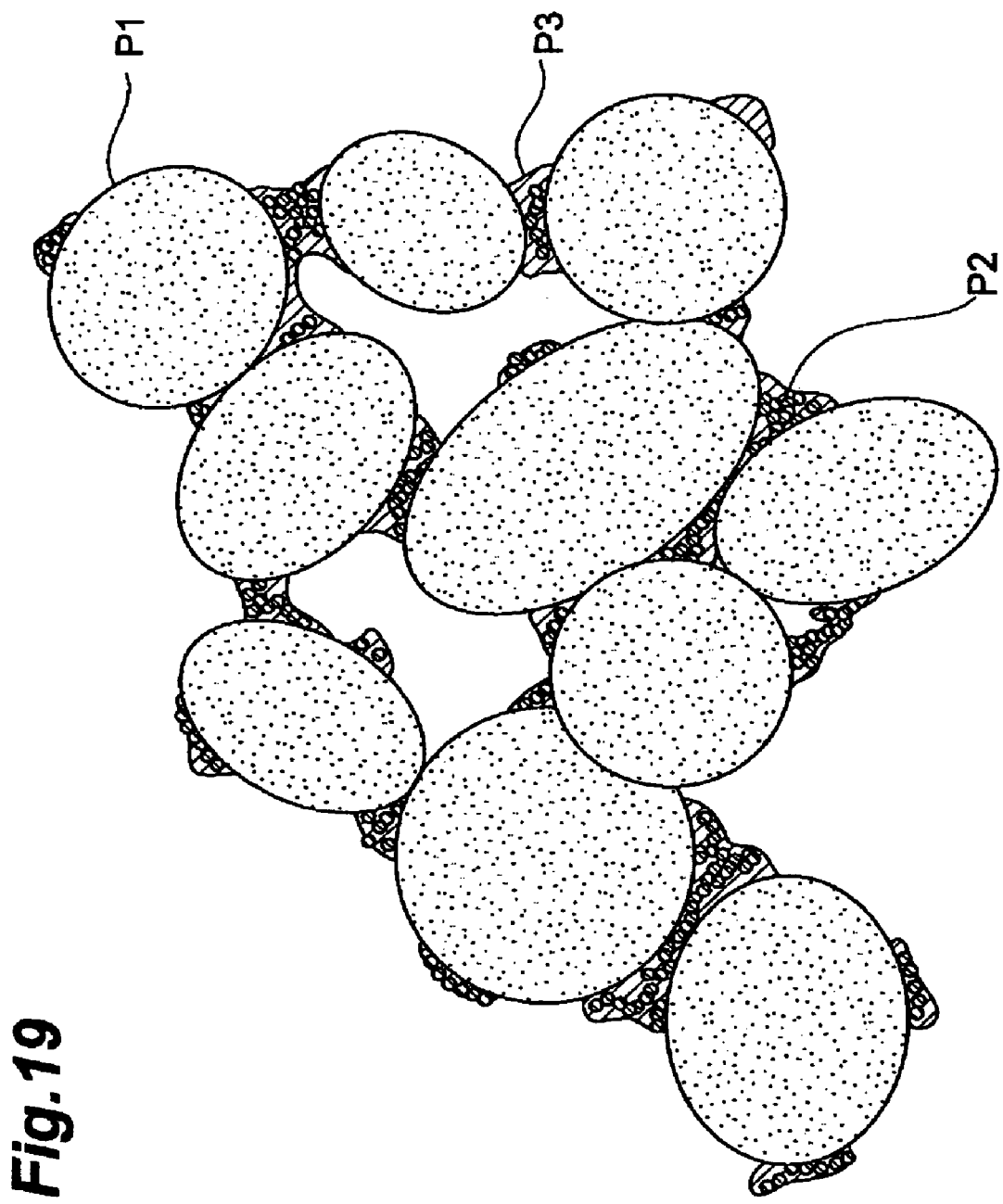
FIG. 19 is a schematic sectional view roughly showing the internal structure of an active material containing layer of an electrode made by the present invention.

An internal structure schematically illustrated in FIG. 19 is formed in the active material containing layer (active material containing layer 18 or 28) made by the wet and dry methods explained in the foregoing. Namely, though the particles P3 made of the binder are used, a structure in which the particles P1 made of the electrode active material and the particles P2 made of the conductive auxiliary agent are electrically connected to each other without being isolated is formed in the active material containing layer (active material containing layer 18 or 28).

Next, in the device assembling part 94, an electrochemical device is assembled while using the laminate (electrode) made of the collector and active material containing layer as at least one, preferably both, of the anode and cathode.

More specifically, a separator 40 prepared separately is initially disposed between the anode 10 and cathode 20 while in contact therewith, whereby a matrix 60 is completed.

Next, the case 50 is produced. When the first and second films are constituted by the composite package film mentioned above, the case 50 is made by a known manufacturing method such as dry lamination, wet lamination, hot-melt lamination, and extrusion lamination. The making of the case is preferably but not necessarily carried out in an inert gas atmosphere. However, the operation of encapsulating the matrix 60 and electrolytic solution 30 into the case 50 is carried out in the inert gas atmosphere.

For example, a film to become a layer made of a synthetic resin constituting the composite package film, and a metal foil made of aluminum or the like are prepared. The metal foil can be prepared by extending a metal material, for example.

Subsequently, the metal foil is bonded by way of an adhesive onto the film to become the layer made of the synthetic resin, etc., so as to produce a composite package film (multilayer film) preferably having the above-mentioned configuration of a plurality of layers. Then, the composite package film is cut into a predetermined size, so as to prepare a single rectangular film.

Next, as explained with reference to FIG. 2 in the above, the film 53 is bent, so as to arrange the matrix 60.

Subsequently, in the contact parts to be thermally fused in the first film 51 and second film 52, parts where the first and second leads are disposed between the edge part (seal part 51B) where the first film 51 is to be thermally fused and the edge part (seal part 52B) where the second film 52 is to be thermally fused are subjected to thermal fusion. From the viewpoint of more reliably attaining a sufficient sealability in the case 50, it will be preferred if the above-mentioned adhesive is applied to the surface of the anode lead 12. As a consequence, after the thermal fusion, an adhesive layer 14 is formed between the anode lead 12 and the first film 51 and second film 52 by the adhesive contributing to their adhesion. In the same procedure as that explained in the foregoing, parts about the cathode lead 22 are subjected to thermal fusion simultaneously with or separately from the thermal fusion mentioned above, whereby the case 50 having a sufficient sealability can be formed.

Next, in the seal part 51B (edge part 51B) of the first film 51 and the seal part 52B (edge part 52B) of the second film 52, the part other than the parts about the anode lead 12 and cathode lead 22 is heat-sealed (thermally fused) by a desirable seal width under a predetermined heating condition with a sealer, for example.

Figure 20:
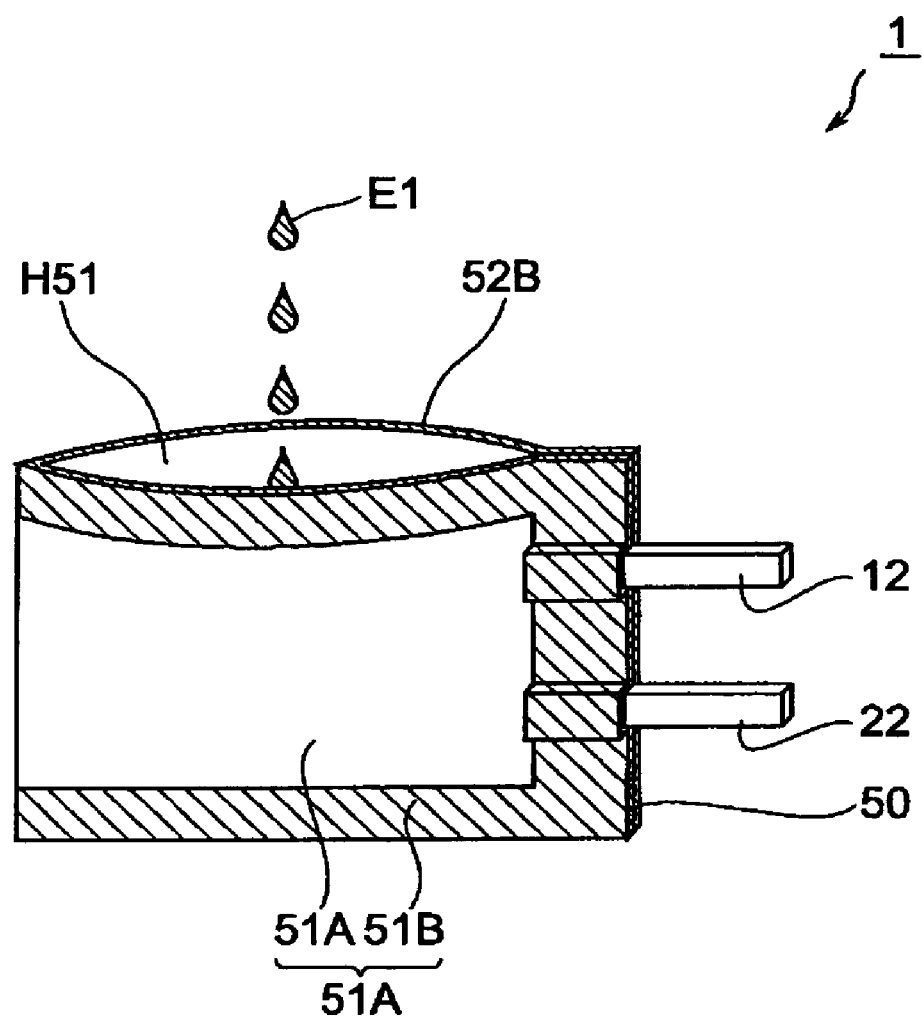
FIG. 20 is an explanatory view showing an example of the procedure of filling the case with a nonaqueous electrolytic solution.

Here, as shown in FIG. 20, a portion without heat seal is provided in order to secure an opening H51 for injecting the nonaqueous electrolytic solution 30. This yields the case 50 having the opening H51.

Figure 21:
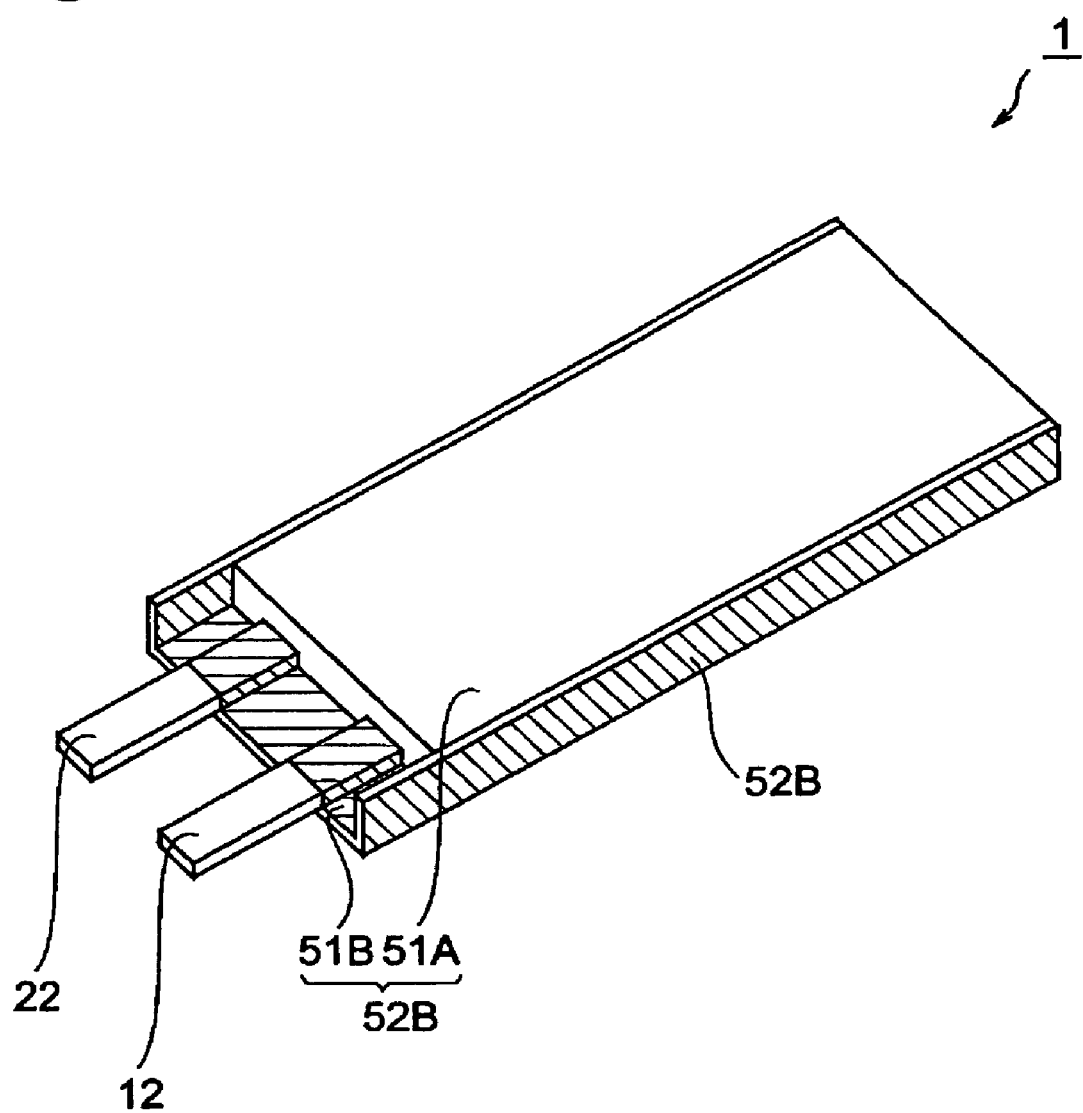
FIG. 21 is a perspective view showing an electrochemical capacitor when seal parts of the case are bent.

Then, in the inert gas atmosphere, the nonaqueous electrolytic solution 30 is injected from the opening H51. Subsequently, a vacuum sealer is used for sealing the opening H51 of the case 50. Further, from the viewpoint of improving the volume energy density with reference to the volume of the space where the capacitor 1 is to be placed, the seal parts of the case 5 are bent when necessary as shown in FIG. 21, whereby the making of the lithium ion secondary battery 1 (electrochemical device) is completed.

Though preferred embodiments of the present invention are explained in the foregoing, the present invention is not limited to the above-mentioned embodiments.

For example, it will be sufficient if the electrochemical device formed by the manufacturing method in accordance with the present invention comprises the electrode formed by the manufacturing method thereof in accordance with the present invention as at least one of electrodes of the anode and cathode. The other configurations and structures are not restricted in particular.

Figure 22:
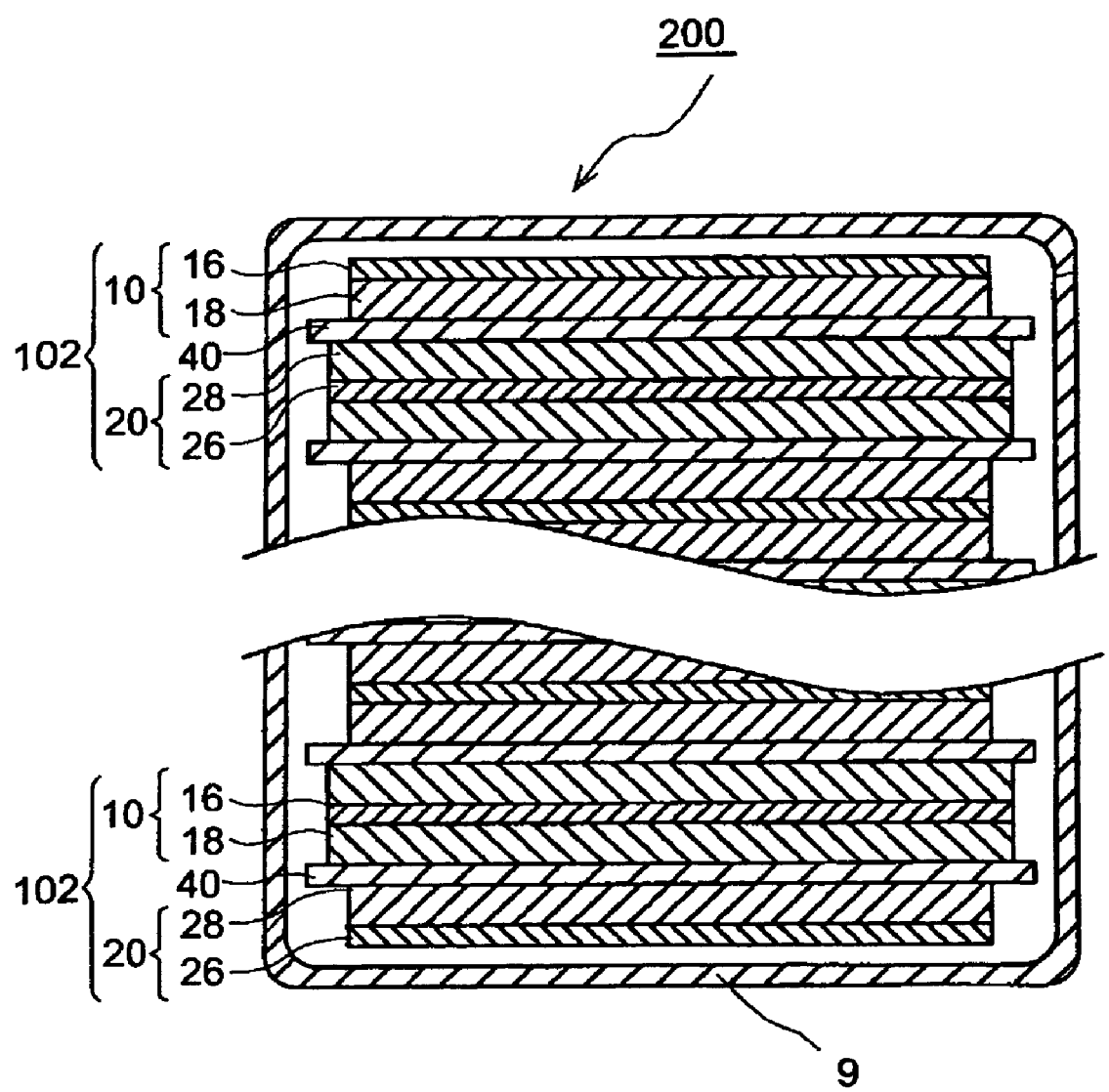
FIG. 22 is a schematic sectional view showing the basic configuration of another embodiment of the electrochemical device obtained by the method of making an electrochemical device in accordance with the present invention.

For example, though the above-mentioned embodiments explain a case of making an electrochemical device comprising one each of the anode 10 and cathode 20, an electrochemical device having a configuration comprising at least one each of the anode 10 and cathode 20 with one separator 40 disposed between each pair of the anode 10 and cathode 20 may be made. Namely, as shown in FIG. 22, a module 200 may be configured such that a plurality of unit cells 102 (each comprising an anode 10, a cathode 20, and an electrolyte layer 40 also acting as a separator) are laminated and held (packaged) in a closed state within a predetermined case 9.

Figure 23:
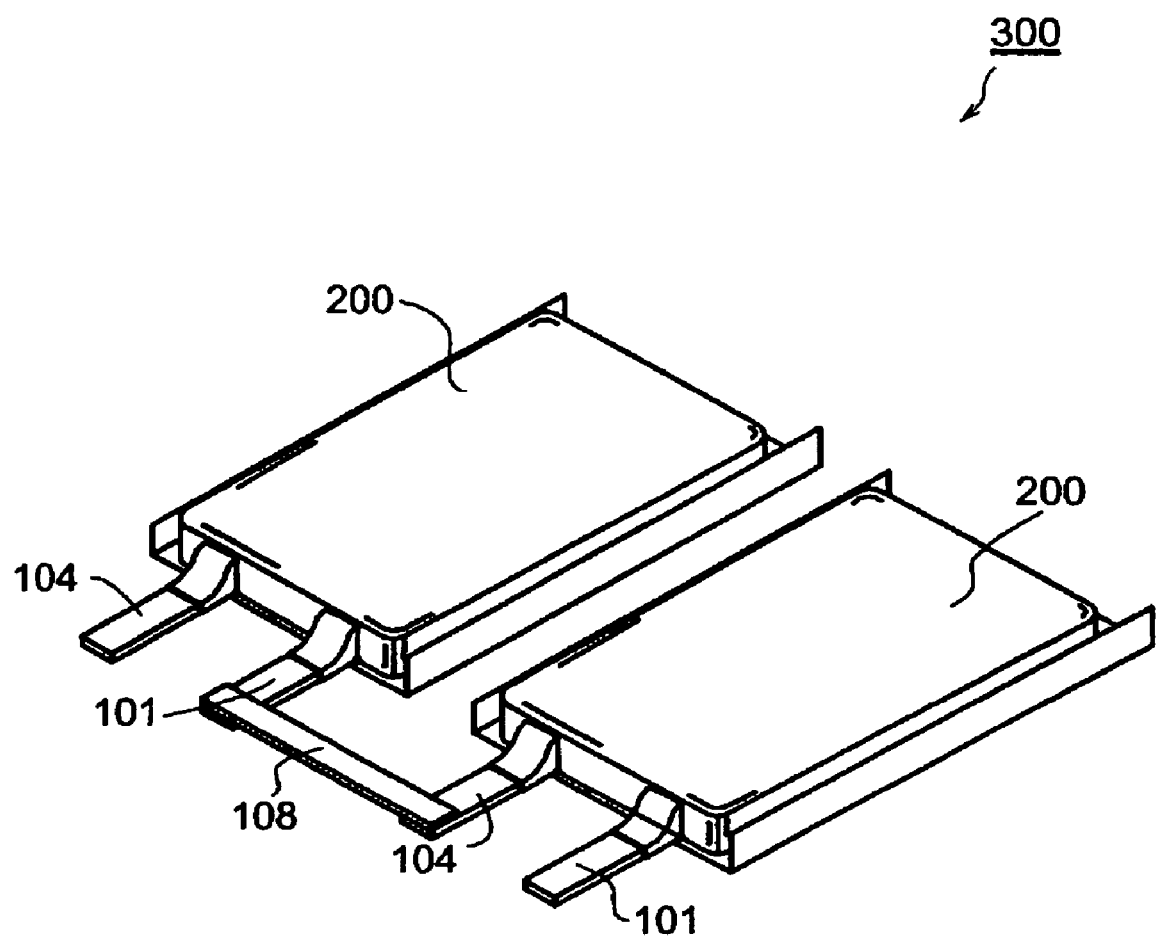
FIG. 23 is a schematic perspective view showing the basic configuration of still another embodiment of the electrochemical device obtained by the method of making an electrochemical device in accordance with the present invention.

Here, the unit cells may be connected either in parallel or in series. Also, for example, a plurality of modules 200 may further be electrically connected in series or in parallel, so as to construct a battery unit. For example, as shown in FIG. 23, a cathode terminal 104 of one module 200 and an anode terminal 102 of another module 200 can be electrically connected to each other by a metal strip 108, so as to construct a serially connected battery unit 300.

For making the module 200 as such, it will be sufficient if the device assembling part 94 is provided with the following mechanism for assembling devices.

Figure 24:
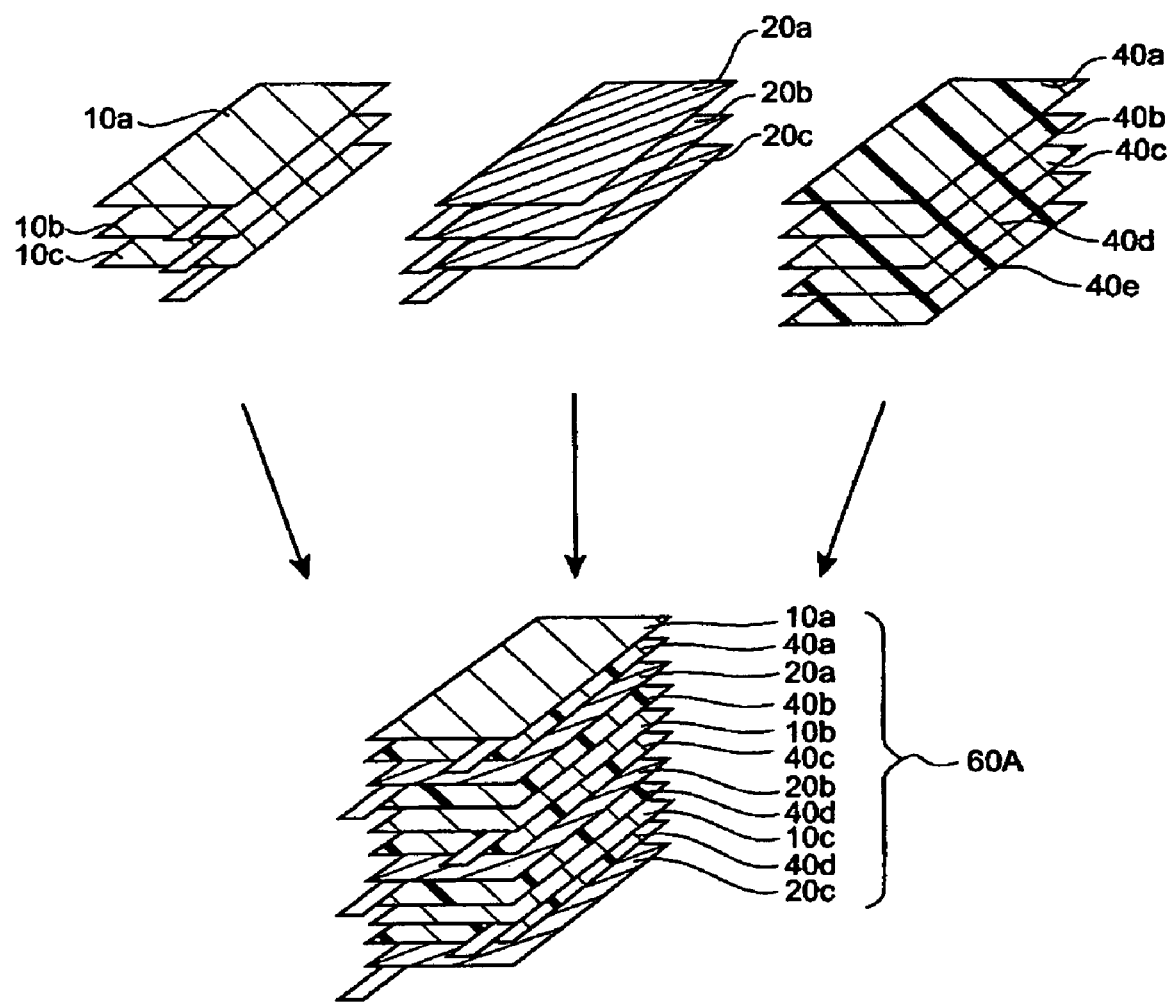
FIG. 24 is an explanatory view showing a manufacturing method when forming an electrochemical device made of a laminate constituted by a plurality of electrodes and separators.

In the case of a configuration in which three anodes 10a to 10c, three cathodes 20a to 20c, and five separators 40a to 40e are laminated, for example, a laminate 60A in which the three anodes 10a to 10c and three cathodes 20a to 20c are alternately laminated in succession with five separators 40a to 40e alternately interposed therebetween is formed in an inert gas atmosphere as shown in FIG. 24. Then, in the inert gas atmosphere, the laminate 60A is encapsulated in the case 50.

When constructing the module 200 or battery unit 300, protection circuits (not depicted) and PTC (not depicted) similar to those provided in known batteries may further be provided if necessary.

Though the above-mentioned embodiment of the electrochemical device explains one having the configuration of a secondary battery, it will be sufficient if the electrochemical device of the present invention comprises, at least, an anode, a cathode, and an electrolyte layer having an ionic conductivity, the anode and cathode opposing each other by way of the electrolyte layer. The electrochemical device may be a primary battery, for example. As the electrode active material of the composite particle P10, not only those exemplified above, but also those used in known primary batteries may be used. The conductive auxiliary agent and binder may be the same as those exemplified above.

The electrode of the present invention is not limited to an electrode for a battery, but may be one used for an electrolytic cell, an electrochemical capacitor (electric double capacitor, aluminum electrolytic capacitor, etc.), or an electrochemical sensor. Also, the electrochemical device of the present invention is not limited to the battery, but may be an electrolytic cell, an electrochemical capacitor (electric double capacitor, aluminum electrolytic capacitor, etc.), or an electrochemical sensor, for example. In the case of an electrode for an electric double layer capacitor, for example, a carbon material having a high electric double layer capacity such as coconut shell activated carbon, pitch type activated carbon, and phenol resin type activated carbon can be used as the electrode active material constituting the composite particle P10.

For example, for an anode used for brine electrolysis, a pyrolyzed product of ruthenium oxide (or mixed oxide of ruthenium oxide and other metal oxides) may be used as an electrode active material constituting the composite particle P10, so as to construct an electrode in which an active material containing layer containing thus obtained composite particle P10 is formed on a titanium support.

When the electrochemical device of the present invention is an electrochemical capacitor, the electrolytic solution is not restricted in particular, whereby a nonaqueous electrolytic solution (nonaqueous electrolytic solution using an organic solvent) employed in an electrochemical capacitor such as known electric double layer capacitor can be used.

Species of the nonaqueous electrolytic solution 30 is not restricted in particular, but is selected in view of the solubility and degree of disassociation of the solute, and the viscosity of the liquid in general. It will be desirable if the nonaqueous electrolytic solution is one having a high conductivity and high potential window (high decomposition start voltage). Examples of the organic solvent include propylene carbonate, diethylene carbonate, and acetonitrile. An example of the electrolyte is a quaternary ammonium salt such as tetraethylammonium tetrafluoroborate (tetraethylammonium boron tetrafluoride). In this case, it is necessary that the mingling moisture be controlled strictly.

EXAMPLES

The present invention will now be explained specifically with reference to Examples and Comparative Examples, which do not restrict the present invention.

Example 1

Making of Carbon Material for Electrode

Before making a composite particle for an electrode in an inert gas atmosphere, mesophase carbon microbeads (spherical synthetic graphite, MCMB) as 450 g of carbon powder (carbon material) were pulverized in a dry fashion for 1 hour together with 1 kg of alumina beads having a diameter of 15 mm in a pot of 1 L in a dry argon gas atmosphere, and were stored in the inert gas atmosphere without coming into contact with the air.

Making of Composite Particle for Electrode

Without in contact with the air, the carbon material (MCMB) for an electrode was transferred to a chamber of a part for making a composite particle for a stirred and rotated fluidized layer electrode filled with a dry argon gas, and was formed into a composite particle using acetylene black as the conductive auxiliary agent and polyvinylidene fluoride as the binder.

The composite particle was formed in the following manner. First, sufficiently dried acetylene black was dispersed into a solution in which sufficiently dried polyvinylidene fluoride was dissolved in N,N-dimethylformamide, so as to prepare a liquid (material liquid). Subsequently, this liquid (containing 3 mass % of acetylene black and 2 mass % of polyvinylidene fluoride) was sprayed with an argon gas to the powder of the carbon material (MCMB) for an electrode fluidized with the dry argon gas in the container, so that the solution adhered to the powder surface. Here, the temperature in the atmosphere where the powder was placed at the time of spraying was held at 80° C., so as to eliminate N,N-dimethylformamide from the powder surface substantially simultaneously with the spraying. Thus, acetylene black and polyvinylidene fluoride were brought into close contact with the powder surface, whereby granules (having an average particle size of 150 μm) were obtained.

The respective amounts of electrode active materials for the cathode and anode, conductive auxiliary agent, and binder employed in the granulating process were adjusted such that the finally obtained granules contained 90 mass % of the electrode active material, 6 mass % of the conductive auxiliary agent, and 4 mass % of the binder. Thus obtained granules were transferred to and stored in the sample storing part of the electrochemical device manufacturing apparatus filled with the dry argon gas.

Making of Electrode

Electrodes were produced by a dry method using no solvent in a dry method electrode making part filled with dry argon in the electrochemical device manufacturing apparatus. The granules having an average particle size of 150 μm stored in the sample storing part in the electrochemical device manufacturing apparatus were transferred to the dry method electrode making part without in contact with the air, and were processed with a hot roll press so as to attain a fixed active material density while being mounted on a collector (made of a copper foil having a thickness of 30 μm) coated beforehand with a hot-melt conductive layer having a thickness of 3 μm, whereby an electrode having an electrode active material layer with a thickness of 70 μm was produced. Thus obtained electrodes were transferred to and stored in the sample storing part of the electrochemical device manufacturing apparatus filled with the dry argon gas.

Making of Electrochemical Device

The making of the lithium ion secondary battery was carried out in the electrochemical device making part of the electrochemical device manufacturing apparatus filled with the dry argon gas. The battery was made in the following manner. A negative electrode made of the carbon material (MCMB) for an electrode stored in the sample storing part in the electrochemical device manufacturing apparatus, a positive electrode made of lithium cobaltate introduced into the electrochemical device making part after being sufficiently dried, and a separator made of a polypropylene porous film were cut into substantially rectangular sheets.

Subsequently, the sheets were aligned and laminated in the order of the positive electrode, porous film, and negative electrode. Then, an elongated aluminum foil and an elongated nickel foil were welded to positive and negative electrode tabs, so as to take out leads. Thus obtained laminate was put into an aluminum laminate pack, into which an appropriate amount of 1-mol/L $LiPF_6$/EC+DC [EC:DMC=1:2 (volume ratio)] electrolytic solution was injected, so as to infiltrate into the laminate. Subsequently, after removing the excess of electrolytic solution in the laminate, the aluminum laminate pack was heat-sealed, so as to yield a lithium ion secondary battery.

Example 2

Making of Carbon Material for Electrode

An electrochemical device manufacturing apparatus having the same configuration as that shown in FIG. 11 was used. Its plasma processing part 91 employed a plasma torch having the same configuration as that shown in FIG. 12. Using the plasma torch, mesophase carbon microbeads (spherical synthetic graphite; MCMB) were continuously sprayed as a carbon powder (carbonaceous material) and subjected to thermal plasma processing, so as to yield a carbon material for an electrode. The MCMB is spherical synthetic graphite.

The thermal plasma processing was carried out with plasma gases having chemical compositions shown in Table 1 with a pressure within the torch of 53 kPa, a frequency of 2 MHz, an input power of 40 kW, a powder supply rate of 1.6 g/min, and a plasma processing time of 5 minutes. According to a model calculation, the plasma temperature became 10,000° C. or higher. The flow ratio in the case using a mixed gas as the plasma gas was such that $Ar:H_2=93:7$.

TABLE 1

|  | Plasma gas [L/min] | | | Pressure within torch [kPa] |
| --- | --- | --- | --- | --- |
|  | Central gas | Sheath gas | Carrier gas | |
| Example 2 | Ar: 6 | Ar: 30<br>$H_2$: 3 | Ar: 5 | 53 |
| Example 3 | Ar: 6 | Ar: 30<br>$H_2$: 3 | Ar: 2.5<br>$CO_2$: 2.5 | 53 |
| Example 4 | Ar: 6 | Ar: 30<br>$H_2$: 3 | Ar: 5.0 | 53 |
| Example 5 | Ar: 6 | Ar: 30<br>$H_2$: 3 | Ar: 2.5<br>$CO_2$: 2.5 | 53 |

Making of Composite Particle, Electrode, and Electrochemical Device

Without in contact with the air, the carbon material (MCMB) for an electrode with a purified and modified surface obtained after the thermal plasma processing was transferred to the chamber of a part for making a composite particle for a stirred and rotated fluidized layer filled with a dry argon gas, and was formed into a composite particle using acetylene black as the conductive auxiliary agent and polyvinylidene fluoride as the binder. Then, electrodes and an electrochemical device (lithium ion secondary battery as in the following) were made in the same manner as in Example 1 except that thus obtained composite particle was used.

Example 3

The composite particle was made as in Example 2 except that the thermal plasma processing atmosphere gas in the thermal plasma processing part at the time of making a composite particle for an electrode was $Ar:H_2:CO_2=87:7:6$. Then, electrodes and an electrochemical device were made as in Example 1 except that thus obtained composite particle was used.

Example 4

In the step of complexing particles in the making of the composite particle for an electrode, spray-drying granulation was carried out instead of the granulation using the stirred and rotated fluidized layer. The complexing of particles was carried out as follows. First, sufficiently dried acetylene black was dispersed in a solution in which MCMB subjected to thermal plasma processing and sufficiently dried vinylidene polyfluoride were dissolved in N,N-dimethylformamide (solvent having a moisture of 40 ppm or less), so as to prepare a liquid (material liquid). Subsequently, this liquid (containing 22.5 mass % of MCMB, 1.5 mass % of acetylene black, and 0.5 mass % of vinylidene polyfluoride) was granulated according to spray drying, whereby granules having an average particle size of 40 μm were obtained. Then, electrodes and an electrochemical device were produced as in Example 1 except that thus obtained composite particle was used.

Example 5

Electrodes and an electrochemical device were made in the same procedure under the same condition as with Example 4 except that the thermal plasma processing atmosphere gas in the thermal plasma processing part at the time of making a composite particle for an electrode was $Ar:H_2:CO_2=87:7:6$.

Example 6

A composite particle was made as in Example 1 except that, before making the composite particle for an electrode in the inert gas atmosphere, the material was subjected to vacuum heating at 3,000° C. for 1 hr instead of the thermal plasma processing, and then was stored in an inert gas atmosphere without in contact with the air. Electrodes and an electrochemical device were made as in Example 1 except that thus obtained composite particle was used.

Example 7

Electrodes and an electrochemical device were made as in Example 2 except that MCMB was not subjected to surface modification processing when making the composite particle for an electrode.

Comparative Example 1

Making of Electrode

Electrodes were made as in Example 1 except that MCMB was subjected to neither surface modification processing nor particle complexing, while using the negative electrode active material, conductive auxiliary agent, and binder in the same composition ratios as in Example 1 in the air.

The electrodes were made as in the following. Into N-methyl-2-pyrrolidone (NMP), polyvinylidene fluoride was dissolved with a concentration of 5 mass %, so as to produce a binder solution. With respect to 4 mass % of polyvinylidene fluoride, 90 mass % of the active material and 6 mass % of the conductive auxiliary agent were mixed in a dry fashion by a hyper mixer. The binder solution was added to thus obtained mixture such that 4 mass % of polyvinylidene fluoride was present with respect to 90 mass % of the active material and 6 mass % of the conductive auxiliary agent, and they were dissolved by a hyper mixer, whereby an active material mixture paint was obtained. Thus prepared mixture paint was applied to one face of the collector (copper foil) by an extrusion nozzle, and then dried. The resulting product was processed with a roller press so as to yield a predetermined active material density, and then was cut into a predetermined size, whereby an electrode having a thickness and an active material density which were equivalent to those of Examples was obtained.

Making of Electrochemical Device

A lithium ion secondary battery was made in the dry environment as in Example 1 but in a different place. Namely, the lithium ion secondary battery was made in a glove box filled with the dry argon gas instead of the electrochemical device making part filled with the dry argon gas in the electrochemical device manufacturing apparatus of Example 1.

Example 8

The electrolytic capacitor was made as in Example 2, whereas electrodes and an electrochemical device were made as in Comparative Example 1.

Battery Charging/Discharging Characteristics Evaluation Test

Tests for evaluating the initial charging/discharging efficiency (initial charging/discharging efficiency), initial discharging capacity, and cycle characteristic of each of the batteries in Examples 1 to 8 and Comparative Example 1 were conducted.

With the charging/discharging current of 1 C, the charging and discharging were carried out by a constant-current low-voltage method and a constant-current method, respectively. Table 2 shows the results in Examples and Comparative Example. Here, the initial charging/discharging efficiency was [(initial discharging capacity)/(initial charging capacity)]×100, the initial discharging capacity was a capacity with reference to the charging capacity of Comparative Example 1 taken as 100, and the cycle characteristic was a cycle at which the discharging capacity became 80% or less of the initial charging capacity.

TABLE 2

| | Initial charging/discharging efficiency [%] | Initial capacity [mAh/g] | Cycle characteristic [times] |
|---|---|---|---|
| Example 1 | 95.5 | 106.7 | 1500 |
| Example 2 | 94.5 | 105.6 | 1500 |
| Example 3 | 93.5 | 404.5 | 1400 |
| Example 4 | 94.5 | 105.6 | 1200 |
| Example 5 | 93.8 | 104.8 | 1200 |
| Example 6 | 93.5 | 104.5 | 1350 |
| Example 7 | 90.5 | 101.1 | 950 |
| Example 8 | 92.3 | 103.1 | 800 |
| Comparative Example 1 | 89.5 | 100.0 | 800 |

What is claimed is:

1. A method of making a composite particle for an electrode, the method comprising a granulating step of integrating a conductive auxiliary agent and a binder adapted to bind the conductive auxiliary agent and an electrode active material together with a particle made of the electrode active material while in close contact with each other in an inert gas atmosphere so as to form a composite particle for an electrode containing the electrode active material, conductive auxiliary agent, and binder, wherein
  the granulating step comprises:
    a material liquid preparing step of preparing a material liquid containing the binder, the conductive auxiliary agent, and a solvent;
    a fluidizing step of putting a particle made of the electrode active material into a fluidizing tank and causing the particle made of the electrode active material to form a fluidized layer; and
    a spraying/drying step of spraying the material liquid into the fluidized layer containing the particle made of the electrode active material so that the material liquid is attached to the particle made of the electrode active material and is dried, so as to remove the solvent from the material liquid attached to a surface of the particle made of the electrode active material, and cause the binder to bring the particle made of the electrode active material and a particle made of the conductive auxiliary agent into close contact with each other.

2. A method of making a composite particle for an electrode according to claim 1, further comprising a plasma processing step of subjecting a material made of a carbonaceous material to high-frequency thermal plasma processing in a plasma gas atmosphere so as to yield a particle made of an electrode active material having an electronic conductivity;

wherein the granulating step is a step of integrating the conductive auxiliary agent and the binder with the particle made of the electrode active material obtained after the plasma processing step in close contact with each other in the inert gas atmosphere so as to form the composite particle for an electrode containing the electrode active material, conductive auxiliary agent, and binder.

3. A method of making a composite particle for an electrode according to claim 1, wherein the granulating step is carried out according to spray drying.

4. A method of making a composite particle for an electrode according to claim 1, wherein the fluidizing step generates a gas flow in the fluidizing tank, and puts a particle made of the electrode active material into the gas flow, so as to fluidize the particle made of the electrode active material.

5. A method of making a composite particle for an electrode according to claim 1, wherein the granulating step adjusts a temperature in the fluidizing tank to a temperature of at least 50° C. but not higher than the melting point of the binder.

6. A method of making a composite particle for an electrode according to claim 4, wherein the gas flow generated in the fluidizing tank in the granulating step is a gas flow comprising an inert gas.

7. A method of making a composite particle for an electrode according to claim 1, wherein the solvent contained in the material liquid is a solvent adapted to dissolve or disperse the binder and disperse the conductive auxiliary agent.

8. A method of making a composite particle for an electrode according to claim 7, wherein the solvent contained in the material liquid has a moisture content of 100 ppm or less.

9. A method of making a composite particle for an electrode according to claim 1, wherein the electrode active material is an active material usable in at least one of a cathode and an anode of a primary or secondary battery.

10. A method of making a composite particle for an electrode according to claim 1, wherein the electrode active material is a carbon material or metal oxide having an electronic conductivity usable in an electrode constituting an electrochemical capacitor.

11. A method of making a composite particle for an electrode according to claim 1, further comprising a particle storing step of encapsulating the composite particle for an electrode obtained after the granulating step into a case capable of storing the composite particle in a closed state in the inert gas atmosphere.

12. A method of making an electrode comprising, at least, a conductive active material containing layer containing an electrode active material and a conductive collector disposed in a state electrically in contact with the active material containing layer, the method comprising:

a composite particle forming step including a granulating step of integrating a conductive auxiliary agent and a binder adapted to bind the conductive auxiliary agent and the electrode active material together with a particle made of the electrode active material while in close contact with each other in an inert gas atmosphere so as to form a composite particle for an electrode containing the electrode active material, conductive auxiliary agent, and binder; and an active material containing layer forming step of forming an active material containing layer at a part to be formed with the active material containing layer in the collector in the inert gas atmosphere by using the composite particle, wherein the granulating step comprises:

a material liquid preparing step of preparing a material liquid containing the binder, the conductive auxiliary agent, and a solvent;

a fluidizing step of putting a particle made of the electrode active material into a fluidizing tank and causing the particle made of the electrode active material to form a fluidized layer; and a spraying/drying step of spraying the material liquid into the fluidized layer containing the particle made of the electrode active material so that the material liquid is attached to the particle made of the electrode active material and is dried, so as to remove the solvent from the material liquid attached to a surface of the particle made of the electrode active material, and cause the binder to bring the particle made of the electrode active material and a particle made of the conductive auxiliary agent into close contact with each other.

13. A method of making an electrode according to claim 12, wherein the composite particle forming step further comprises a plasma processing step of subjecting a material made of a carbonaceous material to high-frequency thermal plasma processing in a plasma gas atmosphere so as to yield a particle made of an electrode active material having an electronic conductivity; and wherein the granulating step is a step of integrating the conductive auxiliary agent and the binder with the particle made of the electrode active material obtained after the plasma processing step in close contact with each other in the inert gas atmosphere so as to form the composite particle for an electrode containing the electrode active material, conductive auxiliary agent, and binder.

14. A method of making an electrode according to claim 12, wherein the active material containing layer forming step comprises:

a sheet forming step of subjecting a powder containing at least the composite particle to heating and pressing so as to yield a sheet containing at least the composite particle; and an active material containing layer arranging step of arranging the sheet as the active material containing layer on the collector.

15. A method of making an electrode according to claim 12, wherein the active material containing layer forming step comprises:

a coating liquid preparing step of preparing an electrode forming coating liquid by adding the composite particle to a liquid adapted to disperse or knead the composite particle;

a step of applying the electrode forming coating liquid to the part to be formed with the active material containing layer in the collector; and a step of solidifying a liquid film constituted by the electrode forming coating liquid applied to the part to be formed with the active material containing layer in the collector.

16. A method of making an electrode according to claim 12, further comprising an electrode storing step of encapsulating the electrode obtained after the active material containing layer forming step into a case capable of storing the composite particle in a closed state in the inert gas atmosphere.

17. A method of making an electrochemical device comprising, at least, an anode, a cathode, and an electrolyte layer having an ionic conductivity, the anode and cathode opposing each other by way of the electrolyte layer, the method comprising:

an electrode forming step of forming an electrode by way of:

a composite particle forming step including a granulating step of integrating a conductive auxiliary agent and a binder adapted to bind the conductive auxiliary agent and an electrode active material together with a particle made of the electrode active material while in close contact with each other in an inert gas atmosphere so as to form a composite particle for an electrode containing the electrode active material, conductive auxiliary agent, and binder; and an active material containing layer forming step of forming an active material containing layer at a part to be formed with the active material containing layer in the collector in the inert gas atmosphere by using the composite particle;

wherein the electrode obtained by the electrode forming step is used as at least one of the anode and cathode, wherein the granulating step comprises:

a material liquid preparing step of preparing a material liquid containing the binder, the conductive auxiliary agent, and a solvent;

a fluidizing step of putting a particle made of the electrode active material into a fluidizing tank and causing the particle made of the electrode active material to form a fluidized layer; and a spraying/drying step of spraying the material liquid into the fluidized layer containing the particle made of the electrode active material so that the material liquid is attached to the particle made of the electrode active material and is dried, so as to remove the solvent from the material liquid attached to a surface of the particle made of the electrode active material, and cause the binder to bring the particle made of the electrode active material and a particle made of the conductive auxiliary agent into close contact with each other.

18. A method of making an electrochemical device according to claim 17, wherein the composite particle forming step further comprises a plasma processing step of subjecting a material made of a carbonaceous material to high-frequency thermal plasma processing so as to yield a particle made of an electrode active material having an electronic conductivity in a plasma gas atmosphere; and wherein the granulating step is a step of integrating the conductive auxiliary agent and the binder with the particle made of the electrode active material obtained after the plasma processing step in close contact with each other in the inert gas atmosphere so as to form the composite particle for an electrode containing the electrode active material, conductive auxiliary agent, and binder.

* * * * *

UNITED STATES PATENT AND TRADEMARK OFFICE
CERTIFICATE OF CORRECTION

PATENT NO. : 7,662,424 B2  Page 1 of 1
APPLICATION NO. : 10/924858
DATED : February 16, 2010
INVENTOR(S) : Kurihara et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1575 days.

Signed and Sealed this

Twenty-eighth Day of December, 2010

David J. Kappos
*Director of the United States Patent and Trademark Office*